(12) United States Patent
Mayes

(10) Patent No.: US 11,579,058 B2
(45) Date of Patent: Feb. 14, 2023

(54) BOND TEST APPARATUS AND METHOD FOR TESTING THE STRENGTH OF BONDS ON ELECTRICAL CIRCUITRY

(71) Applicant: NORDSON CORPORATION, Westlake, OH (US)

(72) Inventor: Ian C. Mayes, Ampthill (GB)

(73) Assignee: Nordson Corporation, Westlake, OH (US)

( * ) Notice: Subject to any disclaimer, the term of this patent is extended or adjusted under 35 U.S.C. 154(b) by 578 days.

(21) Appl. No.: 16/462,937

(22) PCT Filed: Nov. 30, 2017

(86) PCT No.: PCT/US2017/063817
§ 371 (c)(1),
(2) Date: May 22, 2019

(87) PCT Pub. No.: WO2018/102476
PCT Pub. Date: Jun. 7, 2018

(65) Prior Publication Data
US 2019/0310173 A1    Oct. 10, 2019

(30) Foreign Application Priority Data

Dec. 2, 2016    (GB) ..................... 1620548

(51) Int. Cl.
*G01N 3/24*    (2006.01)
*G01N 5/00*    (2006.01)
(Continued)

(52) U.S. Cl.
CPC .............. *G01N 3/24* (2013.01); *G01L 5/0033* (2013.01); *G01N 3/068* (2013.01); *G01N 19/04* (2013.01);
(Continued)

(58) Field of Classification Search
CPC ... G01N 2203/0296; G01N 2203/0067; G01N 2203/005; G01N 2203/0025; G01N 19/04;
(Continued)

(56) References Cited

U.S. PATENT DOCUMENTS

| 4,842,162 A | 6/1989 | Merkel |
| 5,450,745 A | 9/1995 | Flaherty |

(Continued)

FOREIGN PATENT DOCUMENTS

| DE | 235961 A1 | 5/1986 |
| EP | 2363701 A1 | 9/2011 |

(Continued)

OTHER PUBLICATIONS

GB Search report dated May 12, 2017 for GB Application No. 1620548.

(Continued)

*Primary Examiner* — Brandi N Hopkins
(74) *Attorney, Agent, or Firm* — BakerHostetler

(57) ABSTRACT

A bond test apparatus includes a test tool, a stage for mounting a bond for testing, and a drive mechanism comprising a voice coil. The voice coil is coupled to either the stage or to the test tool and is configured to provide relative movement between the stage and the test tool such that the bond applies a test force to the test tool. The bond test apparatus can also include a velocity sensor configured to sense an instantaneous relative velocity between the stage and the test tool, and a controller configured to control the drive mechanism in response to a signal from the velocity sensor. The bond test apparatus can also include a retarding mechanism coupled to the stage or the test tool and configured to apply, in response to relative movement between the stage and the test tool, a retarding force opposing the driving force.

18 Claims, 10 Drawing Sheets

(51) Int. Cl.
*G01N 3/06* (2006.01)
*G01L 5/00* (2006.01)
*G01N 19/04* (2006.01)
*G02B 21/00* (2006.01)

(52) U.S. Cl.
CPC ... *G02B 21/0016* (2013.01); *G01N 2203/005* (2013.01); *G01N 2203/0025* (2013.01); *G01N 2203/0067* (2013.01); *G01N 2203/0296* (2013.01)

(58) Field of Classification Search
CPC ...... G01N 3/068; G01N 3/24; G02B 21/0016; G01L 5/0033; G03F 7/20; G03F 7/70691; G03F 7/70758; G03F 7/70716; G03F 7/70775; G03F 7/709; G03F 7/707; G03F 7/70058; G03F 7/70725; H01L 24/78; G11B 5/486
See application file for complete search history.

(56) References Cited

U.S. PATENT DOCUMENTS

| | | | |
|---|---|---|---|
| 6,078,387 A | 6/2000 | Sykes | |
| 6,310,971 B1 | 10/2001 | Shiiyama | |
| 6,448,723 B1 * | 9/2002 | Wakui | G03F 7/70716 318/135 |
| 8,607,641 B2 | 12/2013 | Lilley et al. | |
| 9,170,189 B2 | 10/2015 | Lilley et al. | |
| 9,482,605 B2 | 11/2016 | Deards et al. | |
| 2004/0226980 A1 * | 11/2004 | Kuboi | B23K 20/023 228/49.1 |
| 2005/0011027 A1 | 1/2005 | Heiniger et al. | |
| 2008/0190212 A1 | 8/2008 | Sykes | |
| 2009/0284590 A1 | 11/2009 | Hawes et al. | |
| 2011/0277555 A1 | 11/2011 | Peecock et al. | |
| 2014/0157909 A1 | 6/2014 | Bin | |
| 2014/0190269 A1 | 7/2014 | Lilley et al. | |
| 2014/0216148 A1 | 8/2014 | Sitterlet | |
| 2016/0282257 A1 | 9/2016 | Kashima et al. | |

FOREIGN PATENT DOCUMENTS

| | | |
|---|---|---|
| EP | 2386846 A1 | 11/2011 |
| EP | 3165895 A1 | 5/2017 |
| WO | 2010/020778 A1 | 2/2010 |

OTHER PUBLICATIONS

IPEA/409—International Preliminary Report on Patentability dated Jun. 13, 2019 for WO Application No. PCT/US17/063817.
ISA/206—Invitation to Pay Additional Fees dated Feb. 21, 2018 for WO Application No. PCT/US17/063817.
ISA/220—Notification of Transmittal of Search Report and Written Opinion of the ISA, or the Declaration dated Apr. 11, 2018 for WO Application No. PCT/US17/063817.

* cited by examiner

BOND TEST APPARATUS AND METHOD FOR TESTING THE STRENGTH OF BONDS ON ELECTRICAL CIRCUITRY

CROSS REFERENCE TO RELATED APPLICATIONS

This application is a National Stage of International Patent App No. PCT/US2017/063817, filed Nov. 30, 2017, which claims priority to United Kingdom Patent Application No. 1620548.6, filed Dec. 2, 2016, the disclosures of which are incorporated by reference herein in their entirety.

FIELD OF THE INVENTION

The present invention relates to a bond test apparatus for testing the strength of bonds on electrical circuitry, such as a PCB or semiconductor device. In particular, the invention relates to an apparatus comprising a bond test tool that is able to perform high-speed bond tests on electrical bonds.

BACKGROUND TO THE INVENTION

Semiconductor devices are very small, typically from 5 mm×5 mm square to 50 mm×50 mm square, and typically comprise numerous sites for the bonding of electrical conductors to a semiconductor substrate. Each bond consists of a solder or gold ball deposit, known as a "bump", adhered to the substrate.

It is necessary to test the bond strength of the bonds, in order to be confident that a particular bonding method is adequate. Because of the very small size of the bonds, tools used to test the bond strength of these bonds must also be small and capable of measuring small forces.

There are several different types of bond tests that are used to test bond strength. For example, shear testing tests the shear strength of a bond by applying a shear force to the side of the bond and shearing the bond off the substrate. Pull testing tests the pull strength of the bond by pulling a ball deposit, or a wire embedded in a ball deposit, away from the substrate. In a push test, a force, or load, is applied in the vertical plane directly downward onto a bond.

Machines that perform these tests typically comprise a bond test tool, be it a shear test tool, push test tool or a pull test tool, that can be positioned relative to the bond under test and then either the bond or the tool is moved in order to perform the test by measuring the force needed to break the bond.

Solder joints, comprising a solder bump bonded to a bond pad on a substrate, can be thought of as a chain where the links of the chain represent the various materials that make up the joint. A simple solder joint on a printed circuit board comprises a number of links: bulk solder, an intermetallic layer at the interface with the bond pad, the bond pad, an adhesive layer between the bond pad and the organic substrate, and the substrate itself. The joint is only as good as its weakest link, so a bond test should reveal the link that is most likely to fail under given conditions.

There is a need to test components, materials and bonds under controlled conditions that generate failure modes similar to those observed during real-life use of those components. Typically, bond testing involves pulling or shearing a bond at relatively low strain rates, but this does not accurately reflect the way that the bond would behave if a load were applied to the bond more rapidly, for example if the bond were to experience a sudden impact, such as the impact that would occur if an electronic device were dropped.

It is well known that solders exhibit time dependent deformation and that their yield point increases with increasing strain rate. At low strain rates the bulk solder is often the weakest link in a solder joint, so that the solder joint is likely to fail by ductile fracture of the bulk solder. At higher strain rates, however, the solder joint may fail in a different way, such as by a brittle fracture. In order to test the behaviour of bonds when loads are applied at high strain rates, it is therefore desirable to perform high-speed bond tests.

High-speed bond tests must generate reliable high test speeds within short distances, and shear tests must also operate with sufficient accuracy for the test tool to impact a specific solder bump, which is typically in the size range of 50 to 800 microns in diameter. The distance needed to accelerate a test tool to high speeds is also a drawback when testing substrates that are densely-packed with components, as the substrate may need to be prepared by removing obstructing components along the tool's acceleration (and deceleration) pathway. These requirements mean that high-speed bond testing is less straightforward than low-speed testing.

The present invention seeks to overcome these deficiencies in the prior art, and to provide an improved bond test apparatus and a method of performing a bond test that are suitable for high-speed bond testing.

SUMMARY OF THE INVENTION

The present invention is defined in the appended independent claims to which reference should now be made. Preferred or advantageous features of the invention are defined in the dependent claims.

Drive Mechanism

In a first aspect the invention provides a bond test apparatus comprising a test tool. The bond test apparatus comprises a stage for mounting a bond for testing, and a drive mechanism comprising a voice coil. The voice coil is coupled to the stage or to the test tool and is configured to provide relative movement between the stage and the test tool such that, in use, the bond applies a test force to the test tool.

The drive mechanism comprises a voice coil, which may be known as a linear voice coil actuator. In response to the application of a current to the voice coil, the voice coil provides a driving force. When an electrical current is supplied to the voice coil, a magnetic field is produced within the coil. This magnetic field interacts with a fixed magnetic field provided by a permanent magnet, generating relative movement between the coil and the permanent magnet. The magnitude of the driving force that is produced by the voice coil is directly proportional to the magnitude of the input current. The driving force may be directed along the axis of the voice coil in either direction, depending on the direction (the polarity) of the current supplied to the voice coil. If the permanent magnet is held stationary, the application of current to the voice coil will create a driving force that causes the voice coil to move, and vice versa. The voice coil in the drive mechanism may be a moving-magnet voice coil, or preferably a moving-coil voice coil. Preferably the voice coil is fixed to the stage, while the permanent magnet is fixed to an underlying frame or sub-stage.

The drive mechanism generates a driving force which creates relative movement of the stage and the test tool. The use of a voice coil in the drive mechanism means that the driving force may advantageously be precisely controlled by controlling the current supplied to the voice coil. The drive mechanism provides the additional advantage that a retarding force can be provided to decelerate the relative velocity by reversing the polarity of the power supply to the voice coil. This allows the controller to precisely accelerate or decelerate the stage relative to the test tool during a bond test, so as to arrive at the target relative velocity as rapidly, and in as short a distance, as possible, and to avoid unwanted collisions between the test tool and other components close to the bond under test.

The voice coil is additionally capable of providing a high driving force, and therefore a rapid acceleration. Preferably the drive mechanism is configured to provide an acceleration and deceleration of greater than 80 m/s$^2$, or 90 m/s$^2$, or 100 m/s$^2$, or 110 m/s$^2$, and/or less than 150 m/s$^2$, or 170 m/s$^2$, or 180 m/s$^2$, or 200 m/s$^2$.

Preferably the drive mechanism may be configured to produce relative movement at a target relative velocity, or test velocity, of at least 10 mm/s. Preferably, the drive mechanism may be configured to produce relative movement at a target relative velocity, or test velocity, of between 10 mm/s and 2000 mm/s, particularly preferably between 100 mm/s and 1000 mm/s, or between 200 mm/s and 500 mm/s. Preferably the target relative velocity may be variable and set by a user.

The drive mechanism is preferably configured to provide a driving force of greater than 200N, or 300N, or 400N, or 500N.

Particularly advantageously, the rapid acceleration provided by the voice coil in the drive mechanism allows the apparatus to accelerate and decelerate the moving components within a short distance. Preferably, the drive mechanism is configured to accelerate the moving components from a stationary position to the target relative velocity, maintain the target relative velocity during the bond test, and decelerate the relative movement to a stationary position within a distance of less than 10 mm, preferably less than 6 mm, particularly preferably less than 1 mm. The drive mechanism is preferably configured to accelerate the moving components from stationary to a test velocity of 100 mm/s, and then to decelerate the moving components to a stationary position, within a distance of 1 mm. This short acceleration and deceleration pathway makes the apparatus of the present invention particularly suitable for testing of substrates that are densely-packed with electronic components, as it reduces the need to remove components from large areas of substrate prior to testing.

Preferably the drive mechanism is configured to provide a driving force to create relative movement between the stage and the test tool in a predetermined linear direction along the axis of the voice coil.

Velocity Sensor

Preferably the apparatus comprises a velocity sensor configured to sense a relative velocity between the stage and the test tool. The apparatus may also comprise a controller configured to control the drive mechanism in response to a signal from the velocity sensor. The controller, the drive mechanism and the velocity sensor may form a feedback loop, configured to feed back a signal containing information on the relative velocity between the stage and the test tool, and to control the drive mechanism based on that signal.

The velocity sensor may advantageously be configured to sense an instantaneous relative velocity between the stage and the test tool. Unlike a traditional encoder-type velocity-sensor, the velocity sensor may measure instantaneous velocity by directly measuring the relative velocity at a given moment, rather than measuring "average" speed increments by measuring the distance travelled over time. The velocity sensor may therefore provide much more rapid feedback than a traditional velocity sensor, allowing the controller to control the drive mechanism precisely with respect to velocity at a given time.

In a preferred embodiment, the velocity sensor comprises a voice coil configured to measure instantaneous velocity. By operating in the opposite manner to the voice coil in the drive mechanism, the voice coil velocity sensor senses the instantaneous velocity of a magnetic portion of the stage (or the test tool) moving within the voice coil. The magnitude of the current generated in the coil is directly proportional to the velocity of the magnetic component moving within the voice coil, such that the current generated in the coil acts as an instantaneous signal indicating the relative velocity.

Test Tool and Stage

The test tool may be configured for use in a particular type of bond test. For example, the test tool may comprise a shear test tool configured to apply a shear force to a solder bump. The test tool may comprise a Cold Bump Pull (CBP) test tool comprising tweezer jaws configured to grip a solder bump. Alternatively, the test tool may comprise a push test tool.

The stage may be configured to mount a substrate to which a bond, or solder bump, is bonded. Preferably the stage may be configured to mount a silicon wafer, a printed circuit board, or any other substrate comprising a bond to be tested.

In a preferred embodiment, the drive mechanism may be configured to apply a driving force to the stage to move the stage relative to a stationary test tool. In an alternative embodiment, the drive mechanism may be configured to apply a driving force to the test tool to move the tool relative to a stationary stage.

The stage and the drive mechanism may advantageously be mounted on a sub-stage, and the bond test apparatus may additionally comprise a secondary drive mechanism configured to move the drive mechanism relative to the test tool. The secondary drive mechanism may be used to position the stage relative to the test tool in preparation for a bond test. During the bond test, the sub-stage preferably remains stationary, and the voice coil of the drive mechanism creates the relative movement required for the bond test.

Drive Method

In a second aspect the invention provides a method of performing a bond test on a bond on a substrate, using a bond test apparatus comprising a test tool. The method comprises the step of using a voice coil to create relative movement between the substrate and the test tool.

Preferably the method comprises the additional steps of sensing a relative velocity between the substrate and the test tool; determining a velocity difference between the sensed relative velocity and a target relative velocity; generating a velocity difference signal; and controlling the relative movement between the substrate and the test tool in response to the velocity difference signal.

The method may be a method of performing a high speed bond test on a bond on a substrate, in which case the method may comprise the additional steps of: sensing an instantaneous relative velocity between the substrate and the test tool; determining an instantaneous velocity difference between the sensed instantaneous relative velocity and a target relative velocity; generating an instantaneous velocity difference signal; and controlling the relative movement between the substrate and the test tool in response to the instantaneous velocity difference signal.

The step of sensing an instantaneous relative velocity may be carried out using a voice coil velocity sensor. This may advantageously allow faster feedback of sensed relative velocity information and velocity difference signals, and so allow faster control of the relative movement between the substrate and the test tool. This is advantageous for high-speed bond testing.

Instantaneous Velocity Sensor

In a third aspect the invention provides a bond test apparatus comprising a test tool. The bond test apparatus comprises a stage for mounting a bond for testing, and a drive mechanism coupled to the stage or the test tool and configured to provide relative movement between the stage and the test tool such that the bond applies a test force to the test tool. The bond test apparatus additionally comprises a velocity sensor configured to sense an instantaneous relative velocity between the stage and the test tool. A controller may be configured to control the drive mechanism in response to a signal from the velocity sensor.

Unlike a traditional encoder-type velocity-sensor, the velocity sensor of the second aspect may be configured to measure instantaneous velocity by directly measuring the relative velocity at a given moment, rather than measuring "average" speed increments by measuring the distance travelled over time.

As the velocity sensor is configured to sense an instantaneous relative velocity between the stage and the test tool, rather than an average velocity, it may provide much more rapid feedback than a velocity sensor that relies on measuring distance and time to determine velocity. This may advantageously allow the controller to control the drive mechanism rapidly and precisely with respect to the relative velocity at a given moment. This rapid and precise velocity control may be highly advantageous for high-speed bond testing.

The velocity sensor preferably outputs a sensed-instantaneous-relative-velocity signal, which is delivered to the controller.

The velocity sensor preferably comprises a voice coil configured to sense an instantaneous relative velocity between the stage and the test tool, as described in relation to the first aspect of the invention. By operating in the opposite manner to the voice coil drive mechanism, a voice coil velocity sensor senses the instantaneous velocity of a magnetic portion of the stage moving within the voice coil. The magnitude of the current generated in the coil is directly proportional to the velocity of the magnetic component moving within the voice coil. Unlike a traditional encoder-type velocity-sensor, the voice coil senses instantaneous velocity by directly measuring the relative velocity at a given moment, rather than measuring "average" speed increments by measuring the distance travelled over time. The voice coil velocity sensor may therefore provide much more rapid feedback than a traditional velocity sensor, allowing the controller to control the drive mechanism precisely with respect to velocity at a given time.

Preferably the drive mechanism comprises a voice coil drive mechanism. The voice coil drive mechanism may be a drive mechanism as described in relation to the first aspect of the invention. Alternatively, to provide a driving force, the drive mechanism may utilise compressed gas, a long spring or a motor and screw mechanism. Any drive mechanism capable of rapidly applying the required driving force may be suitable for use with the apparatus of the present invention.

Preferably the controller is configured, or programmed, to control the drive mechanism to adjust the relative velocity towards a target relative velocity during application of a test force on the test tool by the bond.

As described in relation to the first aspect of the invention, the test tool may be configured for use in a particular type of bond test.

The stage may be configured to mount a substrate to which a bond, or solder bump, is bonded. Preferably the stage may be configured to mount a silicon wafer, a printed circuit board, or any other substrate comprising a bond to be tested.

In a preferred embodiment of the present invention, the drive mechanism is configured to provide a driving force to the stage, so that, in use, the stage moves relative to a stationary test tool. Alternatively, the drive mechanism may be configured to provide a driving force to the test tool, so that, in use, the test tool moves relative to a stationary stage. The component(s) which move under the driving force may be termed the moving components.

When the test tool and the test bond are in contact during the bond test, the force applied to the test tool by the bond may be termed the test force. The test force is the force that is measured by the test tool during the bond test.

The target relative velocity may correspond to a target test force. The target relative velocity and/or the target test force may be input to the controller by a user. In a preferred embodiment, the bond test apparatus is configured to generate a target test force of at least 40N, or 45N, or 50N, or 60N.

The controller preferably comprises a microcontroller configured to communicate with control circuitry formed from other electronic components, such as amplifiers and switches.

Feedback Loop

Preferably the apparatus comprises a feedback loop comprising the controller, the drive mechanism and the velocity sensor, such that the controller is configured to control the drive mechanism in response to feedback signals from the velocity sensor. The feedback loop is preferably configured to control the magnitude of the driving force applied by the drive mechanism, and therefore to control the relative velocity, in response to the velocity difference between the instantaneous relative velocity and the target relative velocity at a given moment.

The controller may advantageously be configured to limit the relative velocity to a target relative velocity in response to a signal from the velocity sensor, and to adjust the relative velocity towards the target relative velocity during application of a test force on the test tool by the bond. It is desirable to maintain a constant relative velocity between the test bond and the test tool throughout the bond test, as a change in the relative velocity during the bond test will affect the test force applied between the test tool and the test bond. Variations in the relative velocity can therefore lead to inaccurate force measurements. This presents a particular challenge for high-speed bond testing, which may be any bond test with a test velocity greater than 10 mm/s, as a bond moving at a high relative velocity is naturally inclined to slow down rapidly on impact with a test tool.

Historically, high-speed bond test systems have relied on the inertia, or momentum, of the system to avoid large changes in velocity when the test bond contacts the sample. The higher the mass and velocity of a component, the higher its inertia, and so the greater its resistance to acceleration or deceleration. Prior art shear systems have therefore used moving components with a high-mass, which require a long acceleration pathway to accelerate the system up to a high test velocity of 100 mm/s or greater, as well as a long deceleration pathway to stop the system following a bond test. This long pathway means that each substrate must be prepared by removing obstructing bonds from the acceleration and deceleration pathways, which is undesirable for testing substrates containing a high number of densely-packed bonds.

In the bond test apparatus of the present invention, the moving component or components (which may include the stage or the test tool) preferably have a low mass, and therefore a low inertia, so that the driving force created by the drive mechanism can accelerate the moving components to the target relative velocity rapidly, and within a short acceleration distance. In an embodiment of the apparatus configured to apply the driving force to the stage, for example, the combined mass of the voice coil, stage and sample to be tested preferably has a mass of 0.5 kg or less.

As the mass of the moving components in the present invention is deliberately low, their inertia is also low. In order to avoid error-inducing changes in velocity when the test bond contacts the test tool, the controller is configured to compensate for sudden changes in velocity by varying the driving force. For example, if the test tool impacts a shear test tool and slows down suddenly, the controller preferably controls the drive mechanism to rapidly increase the driving force in order to accelerate the test bond back to the target relative velocity, and then to maintain the relative velocity at the target relative velocity.

The controller preferably comprises an amplifier configured to amplify the signal from the velocity sensor. Preferably, the amplifier has a sufficiently high input impedance that the bandwidth of the feedback loop is very large, making it suitable for very fast feedback. The use of an amplifier with a high input impedance as part of the controller, or part of the feedback loop, means that the response of the apparatus can be made sufficiently rapid, and sufficiently stable, to control the relative velocity of the apparatus during a high-speed bond test.

Preferably the feedback loop has a large bandwidth, so that the apparatus can sense and provide rapidly changing signals. Particularly preferably the bandwidth of the feedback loop should be greater than 10 kHz. In order to achieve an apparatus-bandwidth of at least 10 kHz, the individual elements of the apparatus are each preferably configured to function over a bandwidth of at least 10 kHz.

Traditional feedback systems use multiple feedback paths to achieve the required degree of stability and response. Stability considerations generally limit gain with tight control being obtained through a secondary feedback loop which integrates the error signal (the velocity difference between the sensed relative velocity and the target relative velocity). Integration introduces a time lag, however, and this in turn means that the increased driving force required when the test bond impacts the test tool does not happen sufficiently quickly to avoid a dramatic drop in speed. A third feedback loop using the differential of the error can reduce this time lag, but when the nature of the impact event is uncontrollable, finding suitable values for the feedback parameters becomes difficult and is generally not successful. For these reasons, traditional multiple-path feedback systems are not adequate for use in high-speed bond testing.

Target Relative Velocity

Preferably, the target relative velocity is maintained at a constant magnitude throughout the period during which the test force is applied to the test tool by the bond. Particularly preferably, the controller and the drive mechanism are configured to maintain the relative velocity within less than 20%, or 10%, or 5% of the target relative velocity when the test force is applied to the test tool by the test bond. In other words, the controller and drive mechanism are preferably configured to maintain the relative velocity at more than 80%, or 90%, or 95% of the target relative velocity when the test force is applied to the test tool by the test bond. Most preferably, the controller and drive mechanism are preferably configured to maintain the relative velocity at more than 95% of the target relative velocity when the test force is applied to the test tool by the test bond.

During a shear test, for example, it is desirable that the shear test tool and the bond under test should contact one another at a target relative velocity, and continue to move relative to one another at the target relative velocity until the bond has moved past the test tool.

The bond test apparatus of the present invention is additionally suitable to carry out bond tests at test velocities lower than those traditionally tested using inertia-controlled systems. For example, the apparatus of the present invention may be configured to operate over a range of test velocities of between 10 mm/s and 500 mm/s, which may be too low for inertia controlled-systems that require high velocities to generate momentum.

Preferably the stage and the drive mechanism are mounted on a sub-stage, and the bond test apparatus additionally comprises a secondary drive mechanism configured to move the drive mechanism relative to the test tool. Preferably, the secondary drive mechanism is coupled to a sub-stage with a larger range of movement than the drive mechanism. Preferably the secondary drive mechanism is configured to move the drive mechanism relative to the test tool in two or three dimensions, for example along orthogonal x, y and z axes. In a preferred embodiment, the drive mechanism and the stage are mounted on the transport assembly, such that the sub-stage is movable to position the drive mechanism and the stage relative to the test tool, for example before the bond test takes place.

The apparatus may additionally comprise a position sensor, which may be an optical encoder, configured to sense the position of the stage relative to the test tool, or relative to the voice coil drive mechanism.

The controller may advantageously be programmed to operate in a "position-control" mode, in which the relative positions of the stage and the test tool are controlled in response to signals from the position sensor, or in a "velocity-control" mode, where the driving force is controlled in response to sensed-instantaneous-relative-velocity signals.

Preferably the controller is programmed to operate in "position-control" mode prior to, and after, a bond test, so that the controller controls the apparatus to automatically position the test bond and the test tool in advance of a bond test operation, and to automatically reposition the test bond and the test tool following the bond test operation.

Control Modes

In a preferred embodiment, the drive mechanism is configured to supply a driving force to a movable stage. A voice coil velocity sensor is arranged at the opposite end of the stage to the drive mechanism, and is arranged so that when the stage moves a magnetic portion of the stage passes within the voice coil velocity sensor and generates a current in the voice coil velocity sensor. The controller comprises a microcontroller configured to control the position of a switch between a first position, in which the apparatus operates in "position-control" mode, and a second position, in which the apparatus operates in "velocity-control" mode. The microcontroller is arranged to receive sensed-position signals from a position sensor configured to sense the position of the stage, and with the switch in "position-control" mode, the microcontroller is arranged to deliver a drive current to the drive mechanism via a power amplifier. The controller further comprises control circuitry in which a differential amplifier is arranged to receive a sensed-instantaneous-velocity signal from the velocity sensor at a first input, and a target-relative-velocity signal from the microcontroller at a second inlet. When the switch is in "velocity-control" mode, the controller provides a target-relative-velocity signal, so that the differential amplifier produces an output signal, the magnitude and polarity of which depends on the relative magnitudes of the sensed instantaneous velocity and the target relative velocity. The differential amplifier is arranged to deliver its output signal to the input of a high-gain amplifier, which amplifies the signal before delivering it to a power amplifier. From the power amplifier, the signal is delivered to the drive mechanism to control the driving force supplied to the stage.

Where the test tool is a shear tool, and the apparatus is configured to carry out a shear test, for example, the controller may control the apparatus to operate as follows:
a) The controller switches to "position-control" mode.
b) The controller controls the secondary drive mechanism to set the start position of the stage and the voice coil drive mechanism.
c) The controller moves the test tool to test position, and moves the test tool to shear height.
d) The controller controls the drive mechanism to slowly move the test bond to contact the test tool, then retracts the stage and the bond to the starting position.
e) The controller sets the gain and required velocity for the bond test.
f) The controller switches to "velocity-control" mode.
g) The controller controls the drive mechanism to accelerate the stage until it reaches the target relative velocity.
h) When the velocity sensor senses that the stage has reached the target relative velocity, the controller controls the drive mechanism to maintain the stage at the target relative velocity.
i) When the bond impacts the test tool, the velocity sensor senses a decrease in the relative velocity due to the test force between the test tool and the bond, so the controller controls the drive mechanism to increase the driving force to maintain the stage at the target relative velocity.
j) Once the stage reaches a predetermined position, the controller sets the target relative velocity to zero, and the controller switches back to "position-control" mode.

In addition to shear testing, push testing and pull testing, the bond test apparatus may advantageously be suitable to perform fatigue testing and constant force creep measurements.

Velocity Sensing Method

In a fourth aspect the invention provides a method of performing a bond test on a bond on a substrate, using a bond test apparatus comprising a test tool. The method may comprise the steps of: generating relative movement between the substrate and the test tool such that the bond applies a test force to the test tool; sensing an instantaneous relative velocity between the substrate and the test tool; and determining a velocity difference between the sensed instantaneous relative velocity and a target relative velocity. The method may comprise the further step of generating a velocity difference signal, which is the difference in velocity between the sensed instantaneous relative velocity and a target relative velocity. The method may comprise the further step of: controlling the relative movement in response to the velocity difference signal.

The method may include the step of recording the test force applied to the test tool by the bond during the bond test. Preferably the method may further comprise the step of controlling the relative movement in order to adjust the relative velocity towards the target relative velocity during the bond test.

The method of performing a bond test is preferably a method of use of the bond test apparatus according to the third aspect.

The step of sensing an instantaneous relative velocity is preferably carried out using a velocity sensor, and the velocity sensor preferably outputs a sensed-instantaneous-relative-velocity signal. Particularly preferably, the step of sensing an instantaneous relative velocity is carried out using a velocity sensor comprising a voice coil, or a voice coil velocity sensor.

Preferably the step of measuring the velocity difference is carried out by a controller, or by a feedback loop, in response to the sensed-instantaneous-relative-velocity signal.

Retarding Mechanism

In a fifth aspect, the invention provides a bond test apparatus comprising a test tool and a stage for mounting a bond for testing. A drive mechanism is configured to apply a driving force to the stage or the test tool to create relative movement between the stage and the test tool so that the bond applies a test force to the test tool. A retarding mechanism is coupled to the stage or the test tool and configured to apply, in response to relative movement between the stage and the test tool, a retarding force opposing the driving force.

The drive mechanism preferably comprises a drive mechanism comprising a voice coil as described in relation to the first aspect of the invention. Alternatively, to provide a driving force, the drive mechanism may utilise compressed gas, a long spring or a motor and screw mechanism. Any drive mechanism capable of rapidly applying the required driving force may be suitable for use with the apparatus of the present invention.

The drive mechanism is preferably controllable by a controller. Preferably the drive mechanism is controlled to provide a constant driving force throughout a bond test. The drive mechanism is preferably configurable to provide a driving force of greater than 200N, or 300N, or 400N, or 500N.

In a preferred embodiment, the drive mechanism is configured to apply the driving force to the stage, so that the stage moves relative to a stationary test tool. Alternatively, the drive mechanism may be configured to apply the driving force to the test tool, so that the test tool moves relative to a stationary stage.

Preferably, the retarding mechanism is configured such that the magnitude of the retarding force depends on the relative velocity between the stage and the test tool. Particularly preferably, the retarding mechanism is configured such that the relative velocity is limited to a target relative velocity at which the retarding force and the driving force are equal in magnitude.

The retarding mechanism may be configured to apply a retarding force at least 5 times, or at least 8, or at least 10 times greater than a test force applied to the test tool by the bond when the stage and the test tool are moving relative to one another at the target relative velocity.

The retarding mechanism is preferably configured so that the magnitude of the retarding force increases as the relative velocity between the stage and the test tool increases. The retarding force may be considered to act in the same direction as the force of friction acting to retard the driving force, so that the total retarding force on the stage includes the retarding force applied by the retarding mechanism and the force of friction.

The retarding mechanism may advantageously act as a speed limiter, and is preferably configured to apply a retarding force, the magnitude of which is related to the relative velocity between the stage and the test tool by a quadratic relationship. Preferably the magnitude of the retarding force is proportional to the relative velocity squared, such that small changes in relative velocity result in relatively larger changes in retarding force, and large changes in retarding force result in relatively smaller changes in relative velocity.

The retarding mechanism may be configured so that, in use, the driving force is greater than the retarding force when the relative velocity is less than the target relative velocity. This force imbalance means that the driving force causes the relative velocity to increase in the predetermined direction, accelerating the moving components of the apparatus. When the relative velocity reaches the target relative velocity, the magnitude of the driving force is equal to the magnitude of the total retarding force (including the force of friction). As the forces are balanced, the relative velocity becomes constant at the target relative velocity.

Particularly preferably, the retarding mechanism is controllable to control the characteristics of the retarding force, such as the magnitude at which the retarding force becomes equal in magnitude to the driving force. By controlling the magnitude at which the forces become equal, the target relative velocity can be controlled.

The retarding mechanism is preferably configured so that the retarding force becomes equal to the driving force at a chosen target relative velocity, or test velocity, of at least 10 mm/s. Particularly preferably, the retarding mechanism is configurable so that the retarding force becomes equal to the driving force at a target relative velocity of between 10 mm/s and 2000 mm/s, particularly preferably between 400 mm/s and 700 mm/s. Most preferably, the retarding mechanism may be configured so that the retarding force becomes equal to the driving force at a target relative velocity of 500 mm/s.

As described in relation to the first aspect of the invention, it is desirable that the bond test takes place at a constant velocity equal to the target relative velocity, or as close to the target relative velocity as possible.

During a bond test, the test force applied between the bond and the test tool acts to retard the driving force, reducing the relative velocity between the stage and the test tool. This effectively increases the magnitude of the total retarding force so that the total retarding force is greater than the driving force.

In order to maintain the relative velocity as close to the target relative velocity as possible, in use, preferably the stiffness of the retarding mechanism is such that a change in the relative magnitudes of the retarding force and the driving force causes a proportionally-smaller change in the relative velocity. For example, the stiffness of the retarding mechanism may be such that the change in relative velocity varies according to the square root of the change in net force. The retarding mechanism may be configured to provide a quadratic relationship between retarding force and velocity.

Retarding Mechanism Comprising Hydraulic Cylinder

In a preferred embodiment, the retarding mechanism comprises a hydraulic cylinder, or piston, containing a hydraulic fluid. The hydraulic cylinder is preferably aligned with the driving mechanism so that relative movement in the predetermined direction causes compression of the hydraulic cylinder, such that the hydraulic cylinder generates a retarding force which acts against the driving force. In this arrangement, the relative velocity between the stage and the test tool is equivalent to a rate of compression of the hydraulic cylinder.

In the preferred embodiment which uses a hydraulic cylinder, the hydraulic cylinder preferably comprises an aperture through which the hydraulic fluid flows when the cylinder is compressed. The size of the aperture restricts the flow of hydraulic fluid, and the flow rate of the hydraulic fluid determines the magnitude of the retarding force applied by the retarding mechanism. The flow rate of the hydraulic fluid is determined by the magnitude of the driving force compressing the piston, and the size of the aperture. The density and viscosity of the hydraulic fluid may also affect the retarding force. The size of the aperture is preferably adjustable to control the magnitude of the retarding force applied by the retarding mechanism at a given relative velocity.

The hydraulic fluid preferably comprises oil, but may comprise any fluid suitable for use in a hydraulic cylinder.

Where the retarding mechanism comprises a hydraulic cylinder, the flow rate of hydraulic fluid through the aperture varies according to the square root of the proportional change in the pressure (which is the force divided by the cylinder area) applied to the cylinder. During a bond test, the retarding effect of the test force reduces the pressure applied to the cylinder, which therefore causes a proportionally smaller change in the flow rate of hydraulic fluid through the aperture. As the relative velocity depends on the flow rate of hydraulic fluid, this resistance to changes in flow rate means that the cylinder resists changes in relative velocity. This inherent stiffness of the hydraulic cylinder means that the reduction in relative velocity during application of the test force is proportional to the square root of the change in pressure. The stiffness of the cylinder therefore lessens the extent to which the relative velocity slows down during a bond test, compared to a retarding mechanism with low stiffness.

In other words, the magnitude of the retarding force provided by the hydraulic cylinder is proportional to the cylinder's rate of compression (the relative velocity) squared, such that large changes in force result in relatively smaller changes in relative velocity and small changes in relative velocity result in relatively larger changes in force. For example, on impact with a test tool during a bond test, a test force of 50N acts against a driving force of 500N to retard the relative movement of the bond. The test force, in addition to a retarding force of 500N from the cylinder, therefore creates a 50N force imbalance on the bond which causes the stage to decelerate. This deceleration causes a decrease in the retarding force provided by the hydraulic cylinder that is proportional to the change in velocity squared. The magnitude of the retarding force decreases by 10%, so that the combined magnitudes of the 450N retarding force and 50N test force once again become equal to the 500N driving force, at which point the relative velocity becomes constant. Due to the cylinder's quadratic relationship between retarding force and velocity, however, the 10% decrease in retarding force leads to approximately 5.1% decrease in the relative velocity. Prior to application of the test force, the retarding force has a proportional value of 1 (when the retarding force is 500N) and the velocity has a proportional value of 1; after application of the test force, the retarding force has a proportional value of 0.9 (as the retarding force has fallen to 450N), so the relative velocity has a proportional value equal to the square root of 0.9, which is 0.949.

Due to the cylinder's quadratic relationship between retarding force and velocity, the retarding force is reduced on impact to a proportionally greater extent than the relative velocity. This allows the forces to re-balance at a higher velocity than would be possible in a system where, for example, retarding force and velocity were directly proportional.

If the magnitude of the retarding force were directly proportional to the change in velocity, the decrease in velocity on impact would be directly proportional to the ratio of the test force to the retarding force at the target relative velocity. A test force of 50N and a retarding force of 500N, as for the example above, would therefore lead to a 10% drop in relative velocity, rather than the 5.1% drop provided by the retarding mechanism of the present invention.

As the change in velocity during a bond test depends on the proportional change in force, or pressure, the retarding mechanism is configured to apply a retarding force at least 5 times greater, or preferably at least 8 times, 10 times, or 12 times greater, than the test force, when the stage and the test tool are moving relative to one another at the target relative velocity. As the retarding force is equal in magnitude to the driving force at the target velocity, this may alternatively be expressed as the driving mechanism being configured to apply a driving force at least 5, 8, 10 or 12 times greater than the test force when the stage and the test tool are moving relative to one another at the target relative velocity. The smaller the proportional change of force, or pressure, caused by the addition of the test force, the smaller the change in relative velocity. In order to ensure that the proportional change in pressure on impact is low, the hydraulic cylinder is configured so that the retarding force (which is equal to the driving force) at the test velocity is much greater in magnitude than the test force. For a test force of 50N, for example, the driving force and retarding force at the test velocity may be 500N, so that the ratio of test force:retarding force is 1:10.

A quadratic relationship between retarding force and velocity additionally means that the greater the retarding force at the target relative velocity, the smaller the decrease in velocity produced by the test force. A test force of 50N and a retarding force of 500N at the test velocity gives a 1:10 ratio of test force:retarding force, and therefore a reduction in relative velocity of approximately 5.1% on application of the test force, as explained above with reference to the hydraulic cylinder. If the retarding force were only 100N at the test velocity, however, the same test force of 50N would give a 1:2 ratio of test force:retarding force, leading to an approximate 29.3% reduction in relative velocity on application of the test force (as the retarding force would drop to 50N, or 50% of its previous value, and the new relative velocity would be proportional to the square root of 0.5). For a given test force, it is therefore preferred to apply a higher retarding force at the test velocity, or the target relative velocity, as higher retarding forces act to reduce the drop in relative velocity during the bond test.

The retarding mechanism is preferably configured so that the ratio of test force:retarding force at the test velocity is sufficiently high that the relative velocity is maintained within less than 20%, or 10%, or 5%, or 2% of the target relative velocity when the test force is applied to the test tool by the test bond. In other words, the retarding mechanism is preferably configured to maintain the relative velocity at more than 80%, or 90%, or 95%, or 98% of the target relative velocity when the test force is applied to the test tool by the test bond.

In a preferred embodiment, the drive mechanism is configured to apply the driving force to the stage to move the stage relative to a stationary test tool. Preferably, the test tool is a shear test tool, and the stage is configured to move in a lateral direction relative to the test tool.

Preferably the bond test apparatus comprises a secondary drive mechanism and a transport assembly as described in relation to the first aspect.

Method of Operation Using Retarding Mechanism

In a sixth aspect the invention provides a method of performing a bond test on a bond on a substrate, using a bond test apparatus comprising a test tool. The method may comprise the steps of: providing a driving force to create relative movement between the substrate and the test tool, providing a retarding force to oppose the driving force using a retarding mechanism coupled to the substrate or the test tool; and when the relative velocity between the substrate and the test tool becomes equal to a target relative velocity, contacting the test tool and the bond so that the bong applies a test force to the test tool.

The magnitude of the retarding force may be dependent on the relative velocity between the substrate and the test tool, such that the relative velocity between the substrate and the test tool is limited to a target relative velocity at which the magnitude of the driving force is equal to the magnitude of the retarding force.

The method may comprise the step of recording a test force applied to the test tool by the bond during the bond test.

Preferably, at the target constant velocity, the magnitude of the retarding force is at least 5 times or at least 8, or at least 10, or at least 12 times greater than the test force applied to the test tool by the bond.

Preferably, the relative magnitudes of the retarding force and the test force at the test velocity are such that the relative velocity decreases by less than 20%, or less than 10%, or less than 5%, when the test force is applied to the test tool by the bond.

The method of performing a bond test according to the sixth aspect of the invention may be a method of use of a bond test apparatus according to the fifth aspect of the invention.

The step of providing a driving force is preferably carried out by a drive mechanism comprising a voice coil. The step of providing a retarding force is preferably provided by restricting the flow of a hydraulic fluid by providing an aperture within a hydraulic cylinder.

BRIEF DESCRIPTION OF THE DRAWINGS

Embodiments of the present invention will now be described in detail, by way of example only, with reference to the accompanying drawings, in which:

FIG. 10 is a perspective view showing the test tool clamped to the tool mounting bracket;

DETAILED DESCRIPTION

Bond Test Apparatus

Figure 1A:
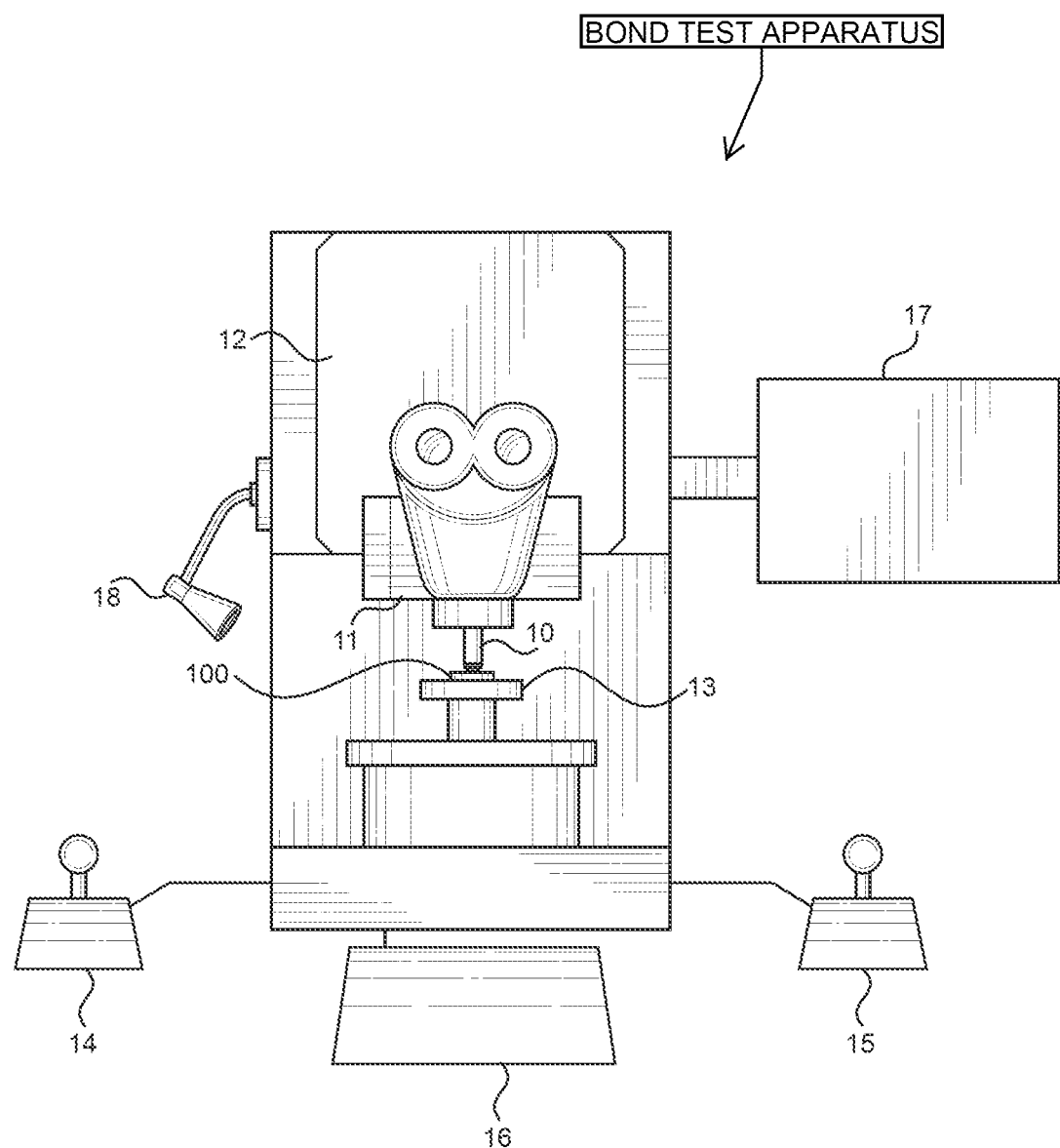
FIG. 1A is a simplified front view of a bond test apparatus that may be used with the present invention.

FIG. 1A is an illustration of a bond testing apparatus in accordance with the present invention. The apparatus comprises a test tool 10 mounted to a test tool cartridge 11, which is itself mounted to the main body of the bond test apparatus 12. Beneath the test tool, the bond test apparatus includes a motorized stage table 13, on which samples or substrates 100 to be tested can be mounted.

The test tool 10, mounted to cartridge 11, can be a shear tool, push tool or a pull tool and can be switched in order to perform different tests. Shear tools are used, for example, for applying a force horizontally across the board to shear a bond off the substrate, and push tools are used, for example, to apply a vertical compression force on a component on the substrate. The force applied by these tools is measured. A pull tool may, for example, have a hook at the bottom of the tool that is used to hook an electrical lead, which is attached between a component and a sample circuit board, with a vertical force being applied to the tool to pull the lead off the board and measure the force required to pull the lead off the board. An example of a suitable shear tool is described in U.S. Pat. No. 6,078,387, the contents of which are incorporated herein by reference. An example of a suitable pull tool is described in U.S. Pat. No. 6,310,971, the contents of which are incorporated herein by reference.

Figure 1B:
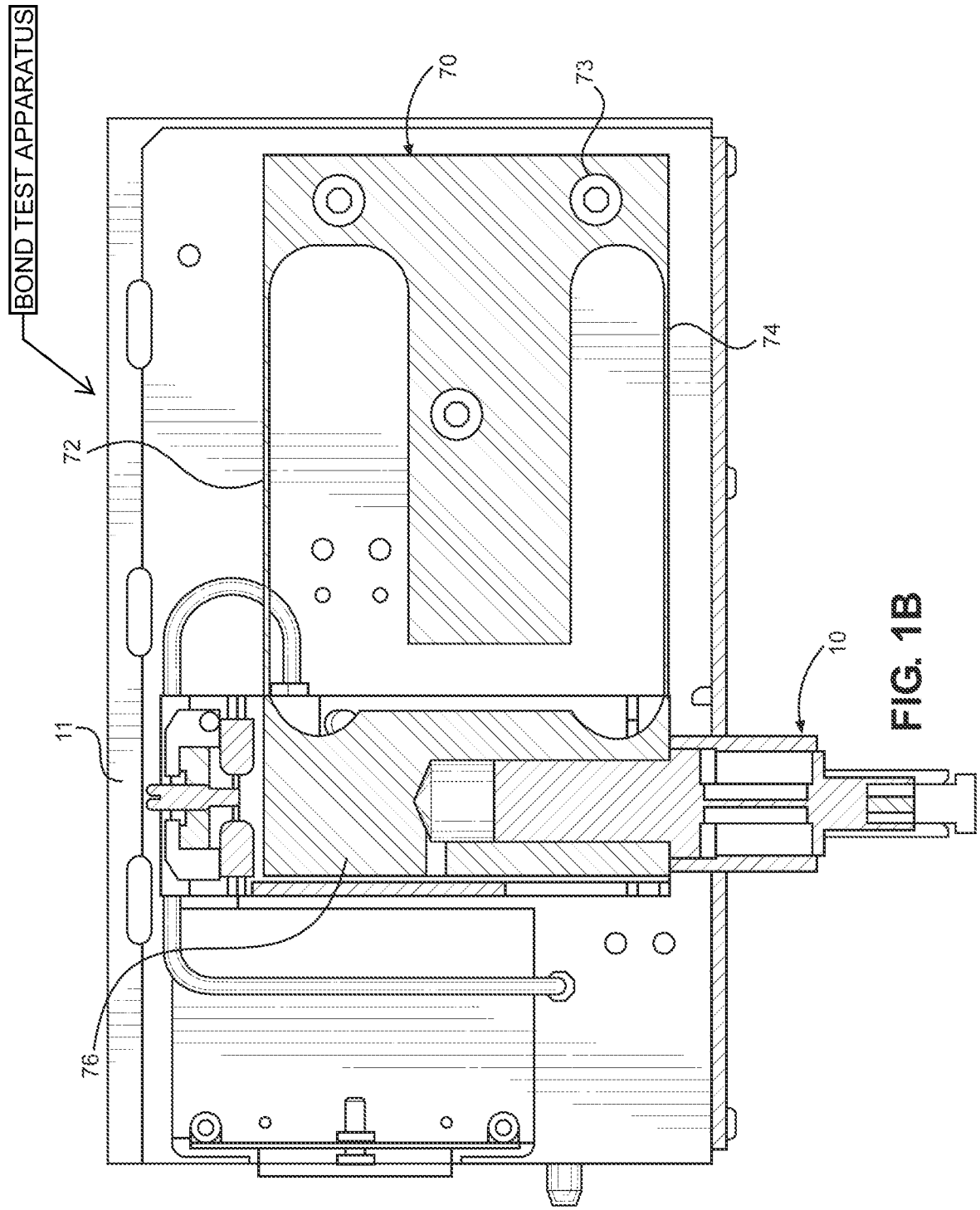
FIG. 1B is a cross-sectional view showing the test tool supported by the tool mounting bracket of the test tool cartridge of the bond test apparatus.
Figure 1C:
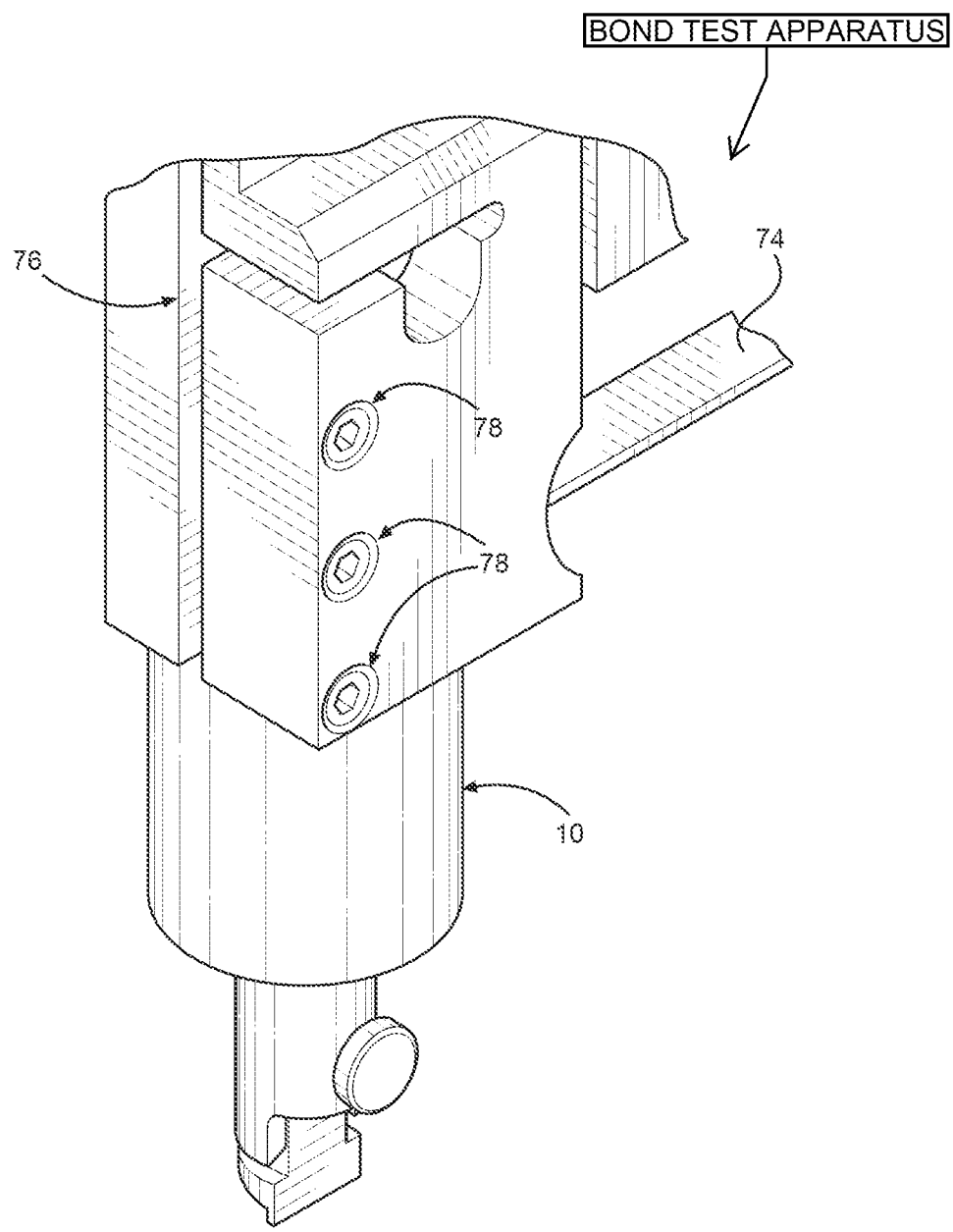
FIG. 1D is a perspective view of a test tool mount and drive portions of the bond test apparatus, including an anti-backlash cylinder.
FIG. 1E is a perspective view of the test tool cartridge of the bond test apparatus.
FIG. 1F is a perspective view of the bond test apparatus.
Figure 1D:
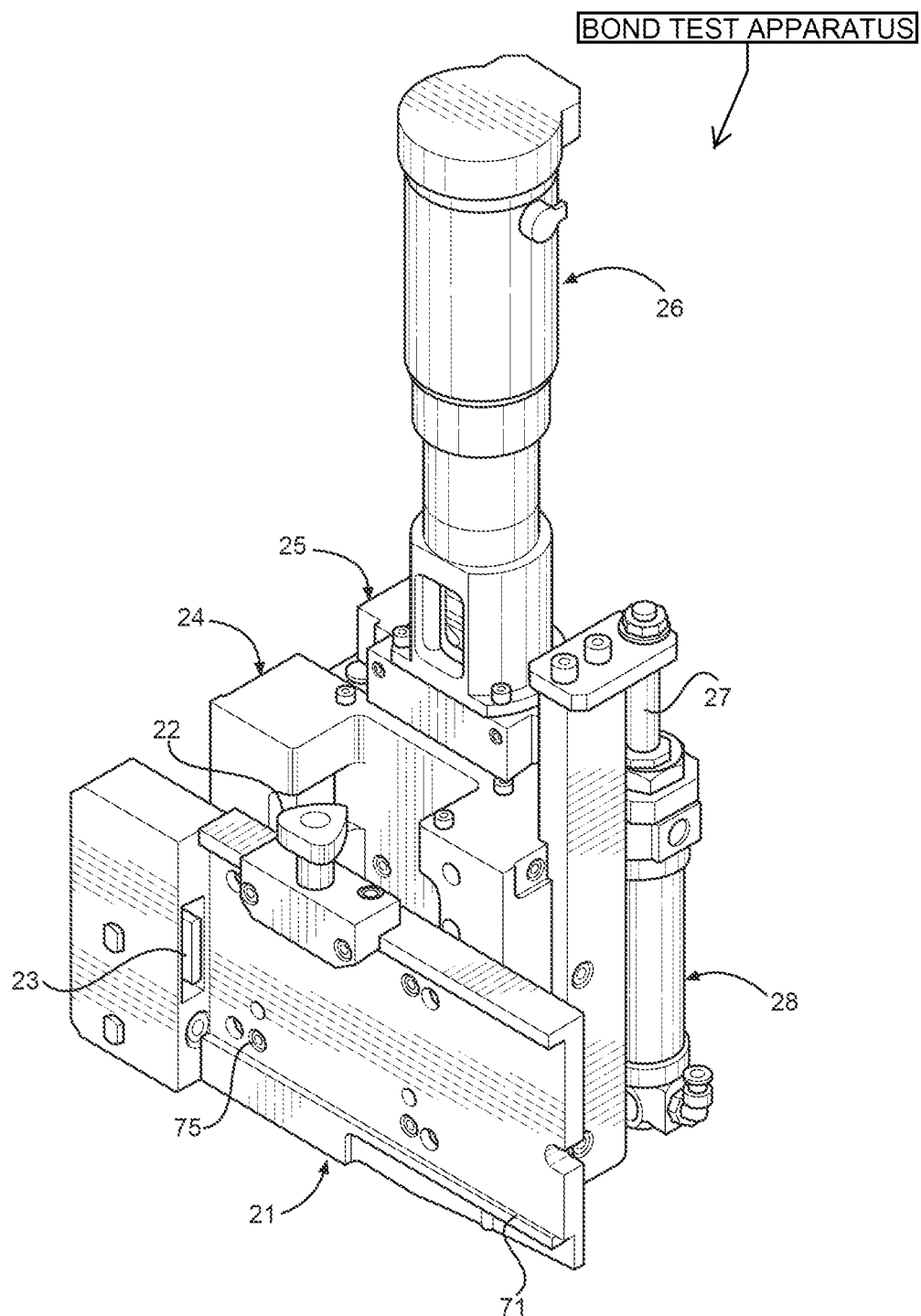
Figure 1E:
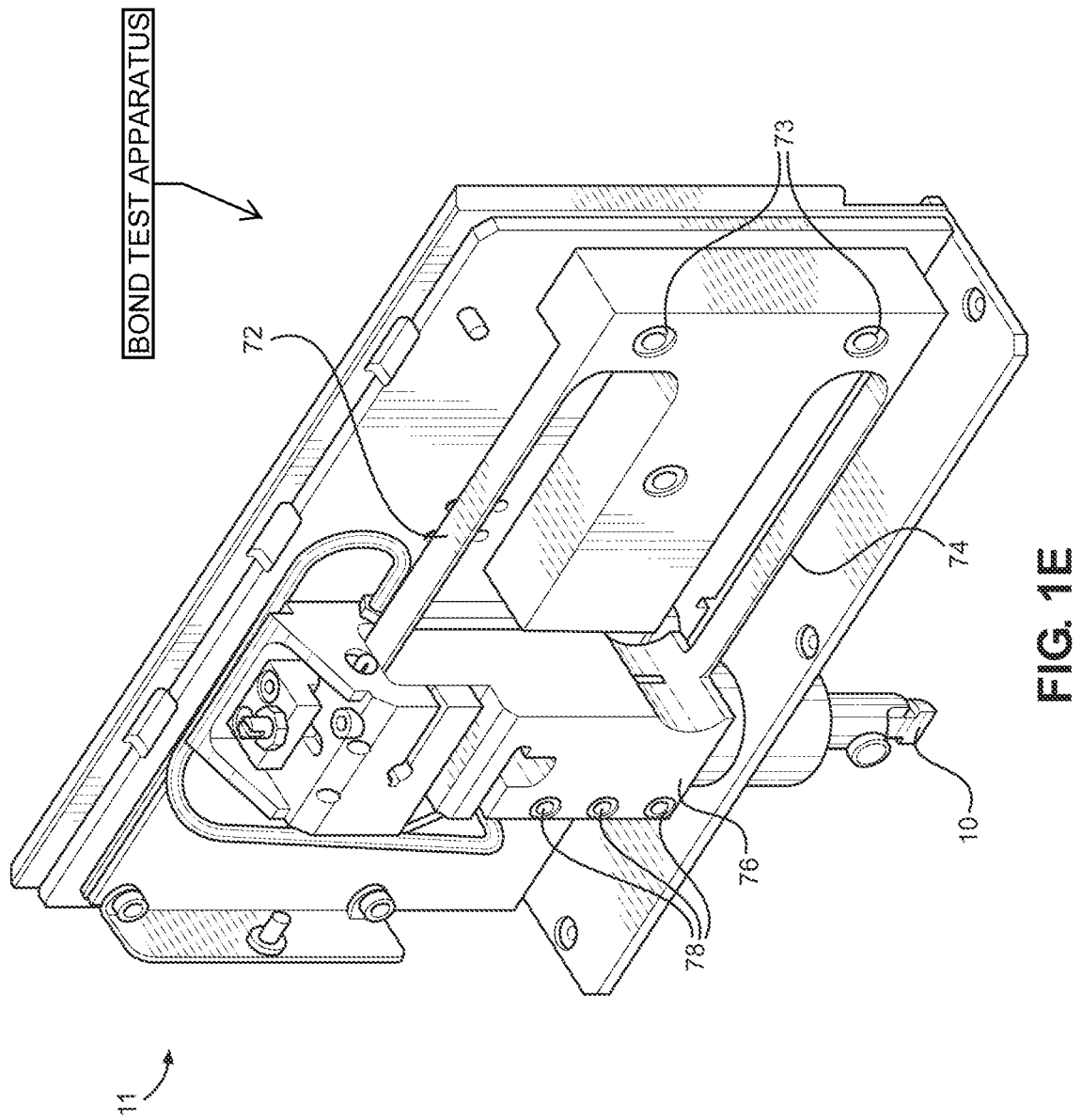

As shown in FIGS. 1B and 1E, the test tool 10 is typically attached to the cartridge 11 by a tool mount bracket 70 having cantilever arms 72, 74 fixed at one end to the cartridge 11 by screws 73, with the free ends of the arms 72, 74 supporting a clamp 76. As shown in FIG. 10, the tool 10 is clamped in clamp 76 by means of clamp screw 78. However, any suitable means for attaching a test tool to the cartridge mount plate may be used in a system in accordance with the present invention.

FIG. 1D shows the retaining channel 71 on the cartridge mount plate 21 into which the test tool cartridge 11 is slid and then secured using one or more screws 22. This design permits different test tool cartridges, having different test tools, to be used with the bond test apparatus, as appropriate for the type of test that the user is conducting. The cartridge mount plate 21 includes a data port 23 that couples with an electrical connector on the test tool cartridge 11 for transferring data from the transducers of cartridge 11 to a PC, such as data representing the force required to shear a solder ball off a substrate or pull a lead off a substrate. An interchangeable test tool cartridge design for a bond test apparatus is well known in the prior art. See for example the Dage 4000 multipurpose bond tester available from Dage Holdings Limited, 25 Faraday Road, Rabans Lane Industrial Area, Aylesbury, Buckinghamshire, United Kingdom.

Figure 1F:
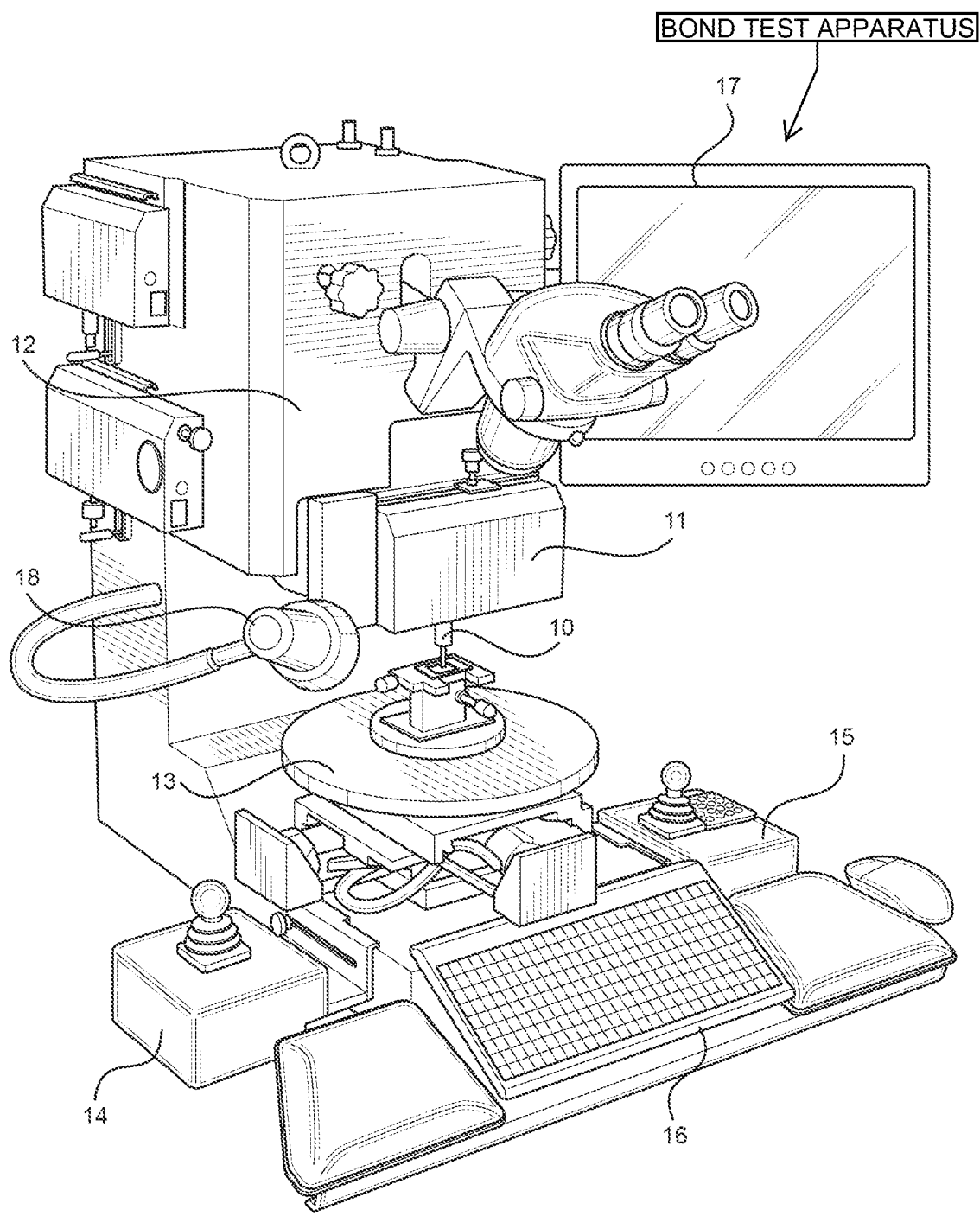

The cartridge 11 is moveable in a z direction normal to the surface of the substrate 100 on the stage table 13. This allows the test tool 10 to be positioned vertically relative to the substrate 100 under test so that it can contact a particular bond during a test. Relative x-y movement between the test tool 10 and the table 13 in a direction parallel to the plane of the substrate 100 is typically achieved by moving the table 13. Movement of the table 13 in x and y is achieved using suitable servo motors or stepper motors, coupled to the table 13 via a lead screw and nut, ball screw and nut, or suitable belt-drive mechanism (not shown), as is also well known in the prior art, such as the Dage 4000 Multipurpose Bond Tester referenced above Also shown in FIGS. 1A and 1F are control devices, comprising two joystick controls 14, 15 to allow for controlling movement of the table 13, and a keyboard 16. A display 17, a light 18 for illuminating the substrate 100 under test, and a microscope, aiding accurate positioning of the test tool 10, are also shown. These features are also all well known in the prior art, such as the Dage 4000 Multipurpose Bond Tester referenced above.

FIG. 1D shows that the mounting plate 21 and its connection to the main body 25. As has been described, the test tool (not shown in FIG. 1D) must be moveable towards and away from a substrate under test. This is achieved by moving the cartridge mount plate 21, to which the test tool 10 is attached, relative to the main body 25 of the device in a direction towards and away from the substrate, herein referred to as the z-axis direction or axial direction. The cartridge mount plate 21 is rigidly coupled to a moving block 24, using screws 75. The moving block 24 is coupled to the main body 25 via a ball screw (or lead screw) and nut and nut block (not shown) that are driven by a servo motor or stepper motor 26.

In order to remove the problem of backlash, an anti-backlash mechanism as described in U.S. Pat. No. 9,170,189 may be included. This mechanism is shown in FIG. 1D, and preferably comprises a pneumatic piston 27 and cylinder 28.

High Speed Bond Test Apparatus Using Feedback Control

Figure 2:
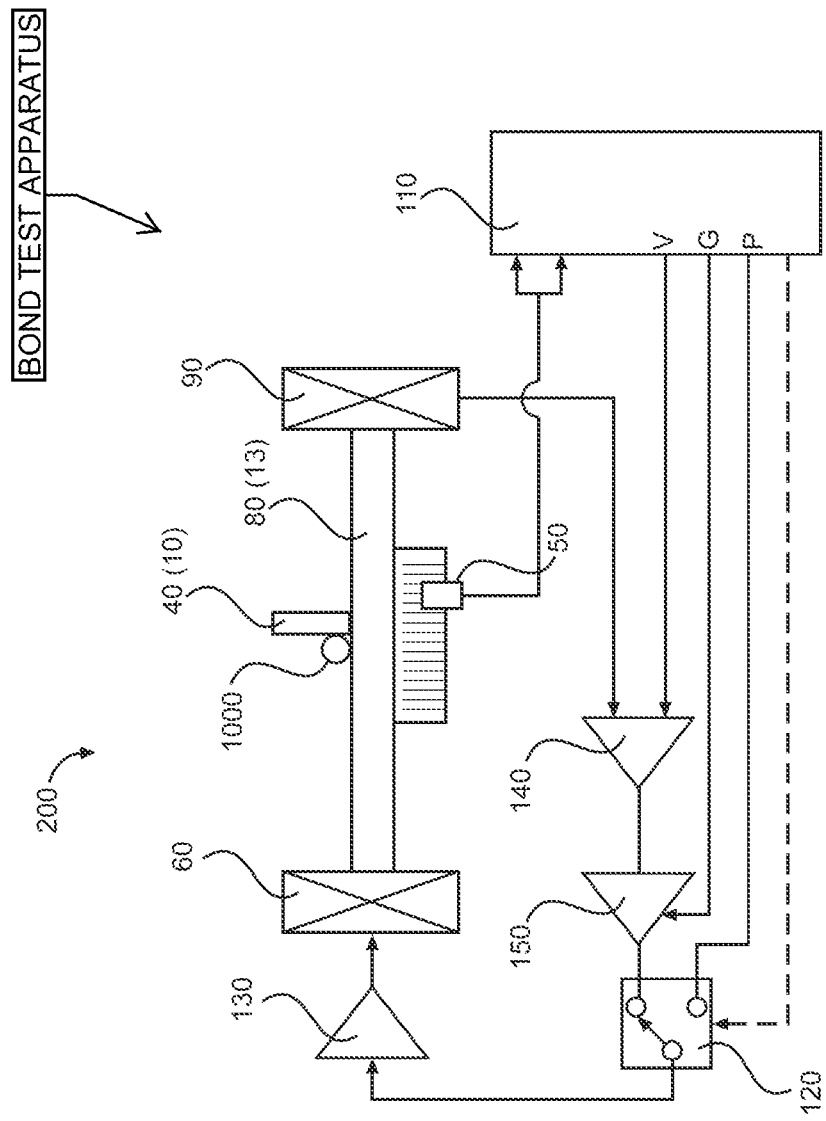
FIG. 2 is a schematic diagram illustrating the control elements of a first embodiment of a bond test apparatus in accordance with the present invention.

As shown in FIG. 2, a first embodiment 200 of the bond test apparatus is configured to carry out a shear test using a stationary shear test tool 40. The bond test apparatus comprises a voice coil drive mechanism 60 coupled to a stage 80 on which a substrate (not shown) carrying a test bond 1000 can be mounted. The voice coil drive mechanism 60 is configured to provide a driving force to the stage 80 when a drive current is provided to the voice coil drive mechanism, so that the stage moves along a test pathway in a predetermined lateral direction (to the right as shown in FIG. 2) relative to the stationary voice coil drive mechanism. The pathway is arranged so that, in use, movement of the stage along the test pathway causes the test bond 1000 to contact the shear test tool 40, so that the shear test tool applies a lateral shear force to the side of the test bond. The length of the test pathway over which the voice coil drive mechanism 60 can move the stage 80 is determined by the length of the voice coil. The direction of the driving force can be reversed by reversing the polarity of the current supplied to the voice coil driving mechanism 60, such that the voice coil driving mechanism can move the stage 80 along the test pathway in both directions.

An optical position sensor 50 is arranged to measure the position of the stage 80 in the predetermined direction, and to deliver a sensed-position-signal to a controller 110.

A voice coil velocity sensor 90 is positioned at the opposite end of the stage 80 from the voice coil drive mechanism 60, so that a magnetic portion of the stage passes through the voice coil velocity sensor 90 when the stage moves. Movement of the stage 80 through the voice coil velocity sensor 90 generates a voltage across the velocity sensor, the magnitude of which is proportional to the instantaneous velocity of the stage 80. The voltage generated across the voice coil velocity sensor 90 creates an instantaneous-relative-velocity signal which is delivered to a first input of a first amplifier 140.

The controller 110 controls a switch 120 to switch the apparatus between a "position-control" (P) mode and a "velocity-control" (V) mode (shown in FIG. 2).

Prior to, and following, a bond test operation, the controller operates in "position-control" (P) mode to set the position of the stage 80, and therefore the test bond 1000, with respect to the test tool 4. In "position-control" (P) mode, the controller controls the current supplied to the voice coil drive mechanism 60 via a power amplifier 130, in response to the sensed-position-signal, so as to move the stage to a desired position along the test pathway.

During a bond test operation, the controller 110 operates in "velocity-control" (V) mode by providing a target-relative-velocity signal to a second input of the first amplifier 140.

The first amplifier 140 is a differential op amp, so in "velocity-control" (V) mode, the output of the first amplifier amplifies the potential difference between the target-relative-velocity signal and the instantaneous-relative-velocity signal. When the target-relative-velocity signal is greater in magnitude than the instantaneous-relative-velocity signal, the output from the first amplifier has a positive polarity, and when the target-relative-velocity signal is smaller in magnitude than the instantaneous-relative-velocity signal, the output from the first amplifier has a negative polarity. The polarity of the first amplifier output determines the polarity of the current supplied to the voice coil drive mechanism 60, and therefore the direction of the driving force.

In the embodiment shown in FIG. 2, the output of the first amplifier 140 is amplified by a second amplifier 150, the gain (G) of which is controlled by the controller 110, before delivery to the voice coil drive mechanism 60 via power amplifier 130.

In "velocity-control" mode, the magnitude of the voltage across (or current supplied to) the voice coil drive mechanism 60 is therefore proportional to the velocity difference between the sensed instantaneous relative velocity of the stage and the target relative velocity for the bond test. Where the sensed instantaneous velocity is lower than the target relative velocity, the voice coil drive mechanism 60 delivers a driving force to accelerate the stage 80. Where the sensed instantaneous velocity becomes equal to the target relative velocity, the voltage across the voice coil drive mechanism will be zero, so no driving force is supplied to the stage 80. Where the sensed instantaneous velocity is higher than the target relative velocity, the voice coil drive mechanism 60 delivers a negative driving force, or a retarding force, to decelerate the stage 80.

The voice coil velocity sensor 90 advantageously provides rapid instantaneous velocity feedback, so that the voice coil driving mechanism is controlled to compensate for velocity changes with very little time lag.

The apparatus is preferably configured to accelerate the stage at at least 110 m/s$^2$. In order to sense these rapid changes in velocity, and provide feedback signals fast enough for the voice coil drive mechanism 60 to react and maintain the target relative velocity throughout a bond test, it is important that the apparatus, including the voice coil velocity sensor 90 and the first amplifier 140, has a large bandwidth. In the preferred embodiment shown in FIG. 2, the apparatus has a bandwidth of 10 kHz. The first amplifier 140, the second amplifier 150 and the power amplifier 130 are selected to have a slew rate of 60 volts per microsecond.

The gain of the second amplifier 150 is selected to be 8480×, as a high gain allows the voice coil drive mechanism 60 to precisely control the driving force even when there is a small velocity difference between the instantaneous relative velocity and the target relative velocity.

Shear Test—Example 1

In use, a user may conduct a shear test by mounting a substrate 100 comprising a test bond 1000 on the stage 80, and inputting the desired test velocity into the controller 110 via a user interface (not shown). Optionally, the user may also set other parameters, such as the acceleration rate and the distance that the test tool may travel before deceleration.

Figure 3:
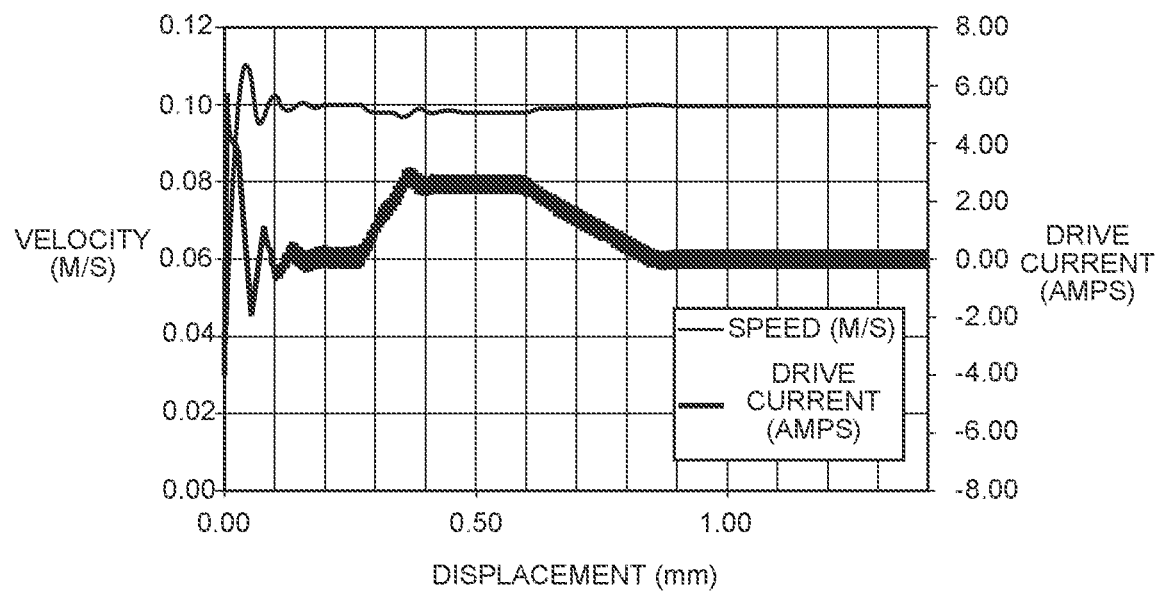
FIGS. 3 and 4 are graphs illustrating the operation of the bond test apparatus of FIG. 2 during a bond test operation.
Figure 4:
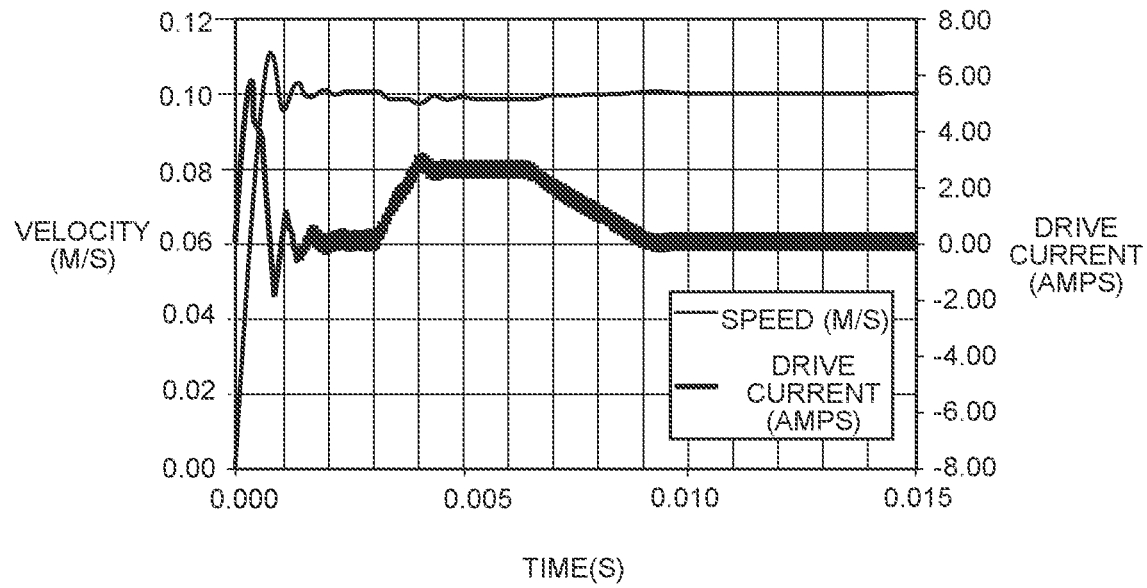

As shown in FIGS. 3 and 4, for example, the apparatus may be controlled to carry out a shear test with a target test velocity of 100 mm/s.

Once the test bond 1000 has been mounted on the stage 80, the user manually controls the transport assembly 10 to position the test bond 1000 adjacent to the shear test tool 40. The user then instructs the controller 110 to carry out a shear test.

The controller switches the switch 120 to "position-control" (P) mode, and moves the shear test tool 40 to the correct height for a shear test. The controller then controls the voice coil drive mechanism 60 to slowly move the stage 80 until the test bond 1000 contacts the test tool 40, then retracts the stage and the bond to the starting position at the end of the test pathway. The controller sets the target relative velocity at 100 mm/s and the gain of the second amplifier 150 at 8480×, based on the information input by the user.

The controller switches the switch 120 to "velocity-control" (V) mode and initiates the bond test. As the instantaneous relative velocity of the stage 80 is initially zero, a drive current of approximately 5 amps is supplied to the voice coil drive mechanism 60, which produces a driving force to accelerate the stage 80 towards the test tool 40. As shown in FIG. 3, due to the rapid acceleration of the stage and the time required to deliver a feedback signal to the drive mechanism, the stage initially accelerates to a velocity of approximately 110 mm/s. When the voice coil velocity sensor 90 senses that the stage has surpassed the target relative velocity, however, a reversed-polarity current is supplied to the voice coil driving mechanism, so that it applies a retarding force to slow down the stage 80. As shown in FIG. 3, the stage reaches the target velocity of 100 mm/s after less than 0.002 seconds, at which time the drive current drops to approximately zero amps, though a small drive current is maintained to balance the force of friction on the stage.

The test bond 1000 impacts the shear test tool 40 at the target relative velocity of 100 mm/s after approximately 0.003 seconds, so that a test force of 50N is applied to the test bond by the stationary test tool. Deformation of the test bond reduces the rate at which the test force is applied, but the test force would normally cause the test bond to slow down rapidly when the test bond impacts the test tool. In the present invention, however, the voice coil velocity sensor 90 senses the reduction in the instantaneous velocity of the test bond, causing the amplifiers 140, 150, 130 to rapidly increase the drive current supplied to the voice coil drive mechanism 60. As shown in FIGS. 3 and 4, the apparatus of the present invention adjusts the drive current, and therefore the driving force, sufficiently rapidly that the velocity of the stage 80 decreases by less than 5 mm/s, or 5% (at 0.004 seconds) following impact with the test tool. The velocity of the stage 80 is then maintained at approximately 98 mm/s before returning to 100 mm/s at approximately 0.007 seconds.

During the period that the test bond is in contact with the shear test tool, the cartridge 5 and the shear test tool 40 measure the test force applied between the test bond 1000 and the test tool 40. During the same period, the voice coil drive mechanism 60 supplies a driving force to counteract the test force in order to maintain the stage within approximately 2% of the target velocity of 100 mm/s.

Eventually the test force causes the test bond 1000 to fail, so that the test force is no longer applied, and the stage begins to accelerate under the driving force. The voice coil velocity sensor 90 senses this acceleration, and the drive current is reduced to approximately zero amps.

Once the position sensor 50 senses that the stage 80 has reached a predetermined finish position, the controller 110 sets the target relative velocity to zero (not shown in FIGS. 3 and 4). This means that a negative drive current is supplied to the voice coil drive mechanism 60, so that the voice coil drive mechanism 60 applies a retarding force to the stage 80 until the stage comes to a halt. The controller then switches the switch 120 back to "position-control" (P) mode in readiness for a new bond test.

The apparatus 200 shown in FIG. 2 may advantageously be configured to be retro-fittable to a bond test apparatus of the prior art. For example, the voice coil drive mechanism 60, stage 80 and velocity sensor 90 may be configured to fix onto the transport assembly of an existing bond test apparatus, such as the Dage 4000 Multipurpose Bond Tester.

Bond Test Apparatus Using Retarding Mechanism

Figure 5:
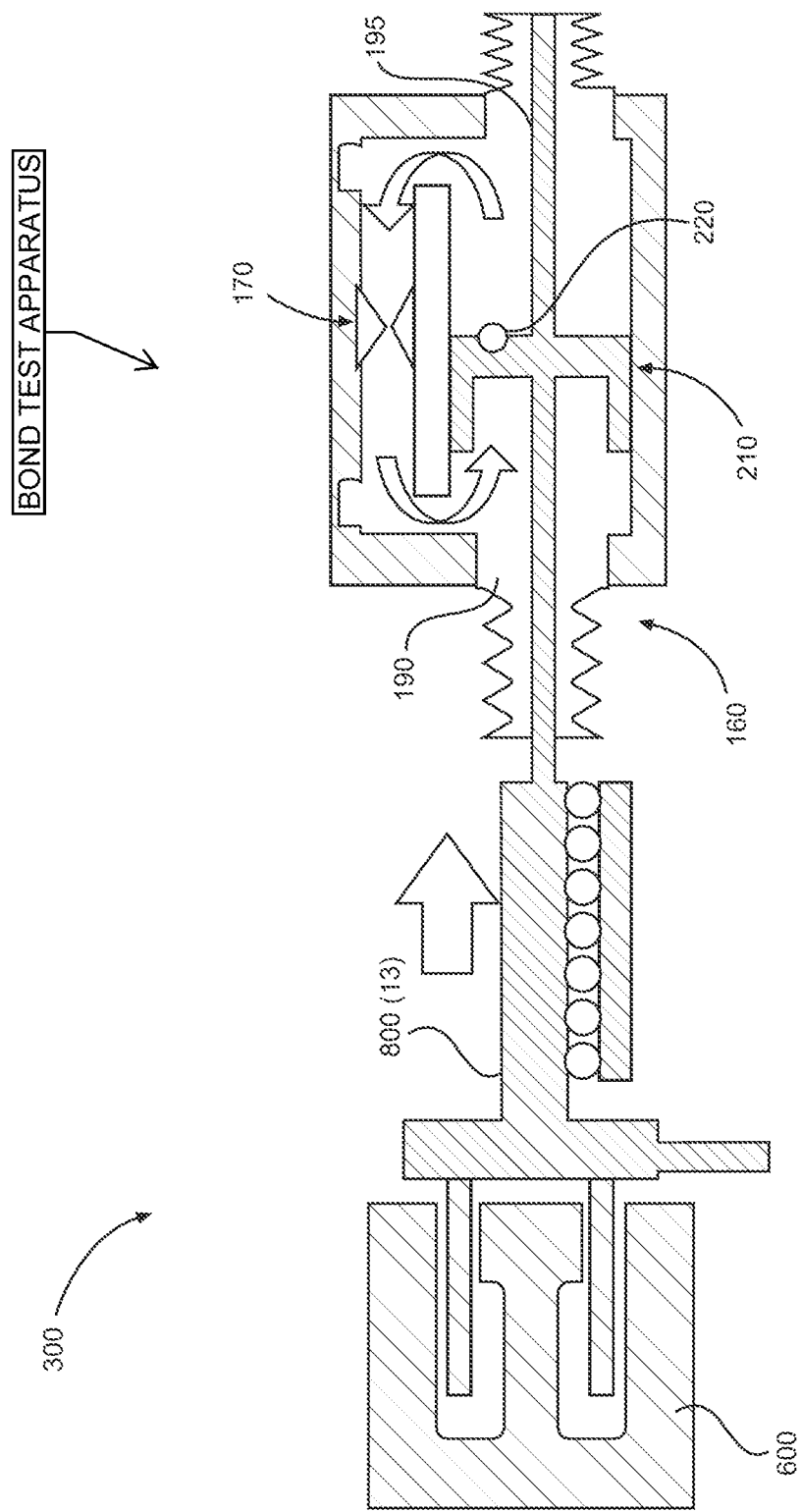
FIG. 5 is a cross-section of a second embodiment of a bond test apparatus according to the present invention.

FIG. 5 shows a cross-section of a second embodiment 300 of a bond test apparatus configured to carry out a shear test using a shear test tool (not shown). The bond test apparatus comprises a fixed-magnet voice coil drive mechanism 600 coupled to a moveable stage 800 on which a substrate (not shown) carrying a test bond can be mounted.

The voice coil drive mechanism 600 is configured to provide a driving force to the stage 800 when a drive current is provided to the voice coil drive mechanism by a controller (not shown). The application of a driving force causes the stage to move along a test pathway in a predetermined lateral direction relative to the fixed magnet of the voice coil drive mechanism 600. The length of the test pathway over which the voice coil drive mechanism 600 can move the stage 80 is determined by the length of the voice coil. The direction of the driving force can be reversed by reversing the polarity of the drive current supplied to the voice coil driving mechanism 600, such that the voice coil driving mechanism can move the stage 800 along the test pathway in both directions.

A hydraulic cylinder 160 containing a hydraulic fluid 180 is aligned with the stage 800 so that movement of the stage along the test pathway towards the test tool causes compression of the hydraulic cylinder. Compression of the hydraulic cylinder 160 generates a retarding force which acts against the driving force supplied by the voice coil driving mechanism 600. In this arrangement, the velocity of the stage 800 is equivalent to a rate of compression of the hydraulic cylinder 160.

The hydraulic cylinder 160 comprises an aperture 170 through which the hydraulic fluid 180 flows when the cylinder is compressed. The flow rate of the hydraulic fluid, and therefore the magnitude of the retarding force applied by the hydraulic cylinder, is determined by the magnitude of the driving force compressing the cylinder, the size of the aperture 170, and the density and viscosity of the hydraulic fluid. The size of the aperture 170 is controllable to control the target test velocity.

The hydraulic cylinder 160 comprises a first chamber 190 and a second chamber 195 separated by a piston 210 which is coupled to the stage 800. Hydraulic fluid 180 can flow between the first and second chambers through the aperture 170. Movement of the stage 800 towards the hydraulic cylinder causes the piston 210 to compress the second chamber 195, so that hydraulic fluid is forced to flow from the second chamber, through the aperture 170, into the first chamber 190. Movement of the stage 800 away from the hydraulic cylinder, for example to return the stage to the start position following a bond test, causes the piston 210 to compress the first chamber 190 so that hydraulic fluid flows into the second chamber 195. A return valve 220 in the piston additionally allows hydraulic fluid to flow from the first chamber into the second chamber when the stage is moving away from the hydraulic cylinder, so as to reduce the retarding force resisting movement of the stage in this direction.

The apparatus 300 shown in FIG. 5 is advantageously retro-fittable to a bond test apparatus of the prior art. For example, the voice coil drive mechanism 600, stage 800 and hydraulic cylinder 160 may be fixed onto the transport assembly of an existing bond test apparatus, such as the Dage 4000 Multipurpose Bond Tester.

Shear Test—Example 2

In use, a user may conduct a shear test by mounting a substrate comprising a test bond on the stage 800, and inputting the desired test velocity into a controller 110 via a user interface (not shown). For example, the apparatus may be controlled to carry out a shear test with a target test velocity of 100 mm/s.

Once the test bond has been mounted on the stage 800, the user manually controls the transport assembly (not shown) to position the test bond adjacent to the shear test tool. The user then instructs the controller 110 to carry out a shear test.

The controller adjusts the size of the aperture 170 to a predetermined size so that the hydraulic cylinder is configured to provide a retarding force of 500N when the stage 800 is moving at a velocity of 100 mm/s.

The controller may control the apparatus to verify the relative positions of the test tool and the test bond, and reposition the apparatus if necessary, before initiating the bond test. The controller provides a constant drive current to the voice coil drive mechanism 600, which provides a constant driving force of 500N to accelerate the stage 800 and the test bond towards the test tool. As the stage moves towards the test tool, the piston 210 compresses the second chamber 195 in the hydraulic cylinder 160, causing hydraulic fluid 180 to flow from the second chamber 195, through the aperture 170, to the first chamber 190.

The flow rate of hydraulic fluid 180 through the aperture 170 when the cylinder 160 is compressed is such that the magnitude of the retarding force increases as the velocity of the stage (and therefore the compression rate of the hydraulic cylinder) increases. The hydraulic cylinder 160 therefore acts as a speed limiter to the moving stage 800.

The fluid dynamics of the hydraulic cylinder 160 and the size of the aperture 170 are such that the driving force on the stage 800 is greater than the retarding force when the velocity of the stage is less than 100 mm/s. This force imbalance means that the stage accelerates towards the shear test tool, compressing the second chamber 195 of the hydraulic cylinder 160. The stage accelerates until it reaches the target velocity of 100 mm/s, at which point both the driving force and the retarding force have an equal magnitude of 500N. As the forces are balanced at the target velocity, the velocity of the stage becomes constant, and the stage moves towards the test tool at the target velocity of 100 mm/s.

When the test bond impacts the shear test tool, a test force of 50 N is applied to the bond, acting to reduce the velocity of the test bond and the stage 800. However, the inherent stiffness of the hydraulic cylinder 160 acts against any change in velocity, and so reduces the extent to which the stage slows down on impact.

The flow rate of hydraulic fluid 180 through the aperture 170 varies according to the square root of the proportional change in the pressure (which is the force divided by the cylinder area) applied to the hydraulic cylinder 160. When the retarding effect of the test force reduces the pressure applied to the cylinder, this therefore causes a proportionally smaller change in the flow rate of hydraulic fluid through the aperture. The velocity of the stage 800 depends on the flow rate of hydraulic fluid through the aperture, so this resistance to changes in flow rate means that the cylinder 160 also resists changes in the velocity of the stage. This inherent stiffness of the hydraulic cylinder 160 means that the reduction in relative velocity during application of the test force is less than it would have been in the absence of the hydraulic cylinder 160.

The test force of 50N means that the driving force on the stage 800 is 500N, while the total retarding force acting on the stage and the test bond is 500N from the cylinder 160 plus 50N of test force from the test tool. This force imbalance produces a 10% proportional change in the pressure (force over cylinder area) on the hydraulic cylinder 160, but due to the inherent stiffness of the hydraulic cylinder 160 and the resulting quadratic relationship between force and velocity, the velocity of the stage 800 is only reduced by approximately 5.1% (the pressure is reduced to 90% of its former value, so the velocity is reduced proportionally to the square root of 0.9).

Figure 6:
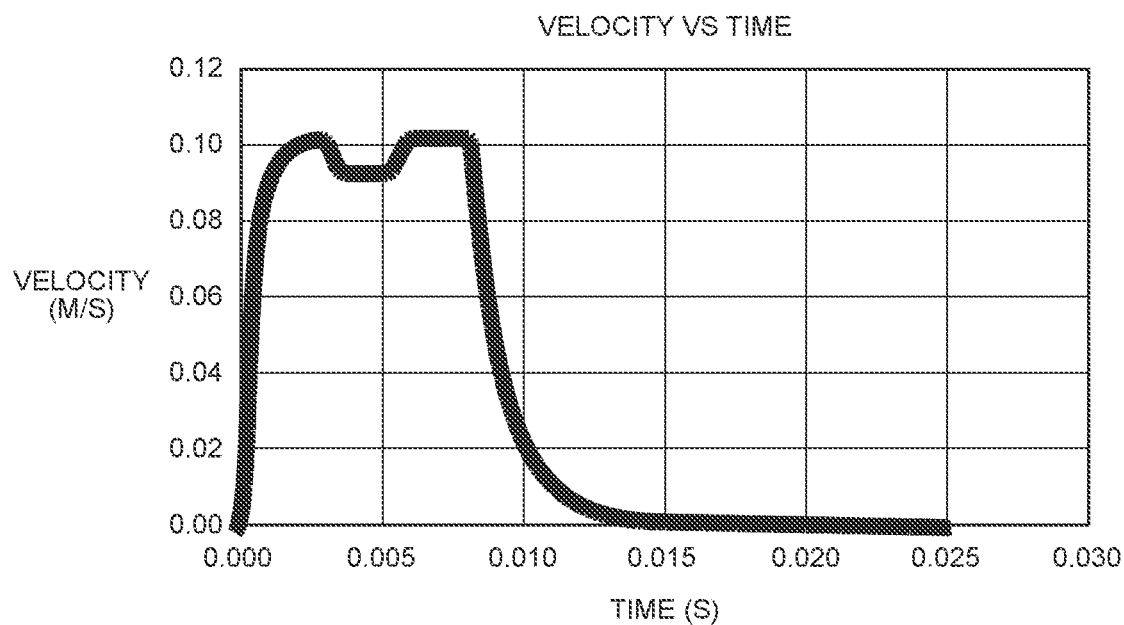
FIG. 6 is a graph illustrating exemplary velocity vs distance characteristics of the bond test apparatus of FIG. 5 during a bond test operation.
Figure 7:
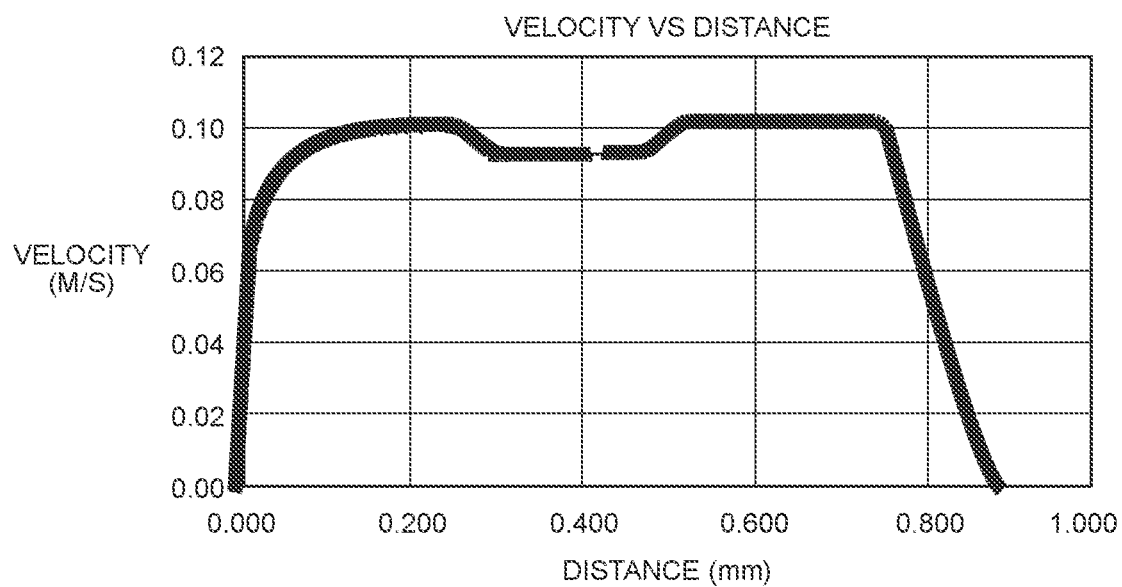
FIG. 7 is a graph illustrating exemplary velocity vs time characteristics of the bond test apparatus of FIG. 5 during a bond test operation.

FIGS. 6 and 7 shows exemplary velocity vs distance and velocity vs time characteristics of a shear test carried out using a bond test apparatus as described in relation to FIG. 5. The test illustrated in FIG. 6 has a test velocity of 100 mm/s, and a test force of 50N, and was carried out using a voice coil driving mechanism providing a constant driving force of 300N.

As described in relation to FIG. 5, a test bond is mounted on the stage 800, and the user manually controls the transport assembly (not shown) to position the test bond adjacent to the shear test tool. The user then instructs the controller 110 to carry out a shear test.

Prior to carrying out the shear test, the controller adjusts the size of the aperture 170 to a predetermined size so that the hydraulic cylinder 160 is configured to provide a retarding force of 300N when the stage 800 is moving at a velocity of 100 mm/s.

As shown in FIGS. 6 and 7, the voice coil drive mechanism 600 accelerates the stage 800 to a velocity of 100 mm/s, or 0.10 m/s, within approximately 0.002 seconds, and within a distance of approximately 0.14 mm. After travelling a total distance of approximately 0.26 mm in 0.003 seconds, the test bond contacts the test tool. At this point, the driving force on the bond is 300N, and the total retarding force is 350N (300N from the hydraulic cylinder plus 50N test force), causing the stage to decelerate until the retarding force from the hydraulic cylinder 160 becomes 250N, so that the total retarding force is equal to the driving force and the velocity becomes constant. As shown in FIGS. 6 and 7, the stage slows down to approximately 93 mm/s, corresponding to approximately 7% reduction in velocity. At a time of approximately 0.005 seconds and a distance of approximately 0.470 mm, the test bond fails, so that the test force is no longer applied, and the stage accelerates to a constant velocity of 100 mm/s once again. After approximately 0.008 seconds and 0.74 mm, the voice coil drive mechanism stops providing the driving force, and instead provides a retarding force to the stage to decelerate it to a halt at a distance of 0.88 mm from its starting position.

The invention claimed is:

1. A bond test apparatus, comprising:
   a test tool;
   a stage configured to mount a bond for testing;
   a drive mechanism comprising a voice coil;
   the test tool is arranged and configured to contact the bond for testing,
   a velocity sensor configured to sense a relative velocity between the stage and the test tool; and
   a controller configured to control the drive mechanism in response to a signal from the velocity sensor,
   wherein the bond test apparatus is configured to carry out a shear test on the bond, and
   wherein the voice coil is coupled to the stage or to the test tool and the voice coil is configured to provide relative movement between the stage and the test tool such that, in use, the test tool applies a test force to the bond.

2. The bond test apparatus of claim 1, wherein the velocity sensor is configured to sense an instantaneous relative velocity between the stage and the test tool.

3. The bond test apparatus of claim 1, wherein the velocity sensor comprises a voice coil.

4. A bond test apparatus, comprising:
   a test tool;
   a stage configured to mount a bond for testing;
   a drive mechanism comprising a voice coil; and
   the test tool is arranged and configured to contact the bond for testing,
   wherein the voice coil is coupled to the stage or to the test tool and the voice coil is configured to provide relative movement between the stage and the test tool such that, in use, the test tool applies a test force to the bond; and
   wherein the test tool is a shear test tool, or a pull test tool, or a push test tool.

5. A bond test apparatus, comprising:
   a test tool;
   a stage configured to mount a bond for testing;
   a drive mechanism comprising a voice coil; and
   the test tool is arranged and configured to contact the bond for testing,
   wherein the voice coil is coupled to the stage or to the test tool and the voice coil is configured to provide relative movement between the stage and the test tool such that, in use, the test tool applies a test force to the bond; and
   wherein the drive mechanism is configured to apply a driving force to the stage to move the stage relative to a stationary test tool.

6. The bond test apparatus of claim 5, wherein the stage and the drive mechanism are mounted on a sub-stage, the bond test apparatus further comprising a secondary drive mechanism configured to move the voice coil relative to the test tool.

7. A bond test apparatus, comprising:
a test tool;
a stage configured to mount a bond for testing;
a drive mechanism coupled to the stage or the test tool and configured to provide relative movement between the stage and the test tool such that the bond applies a test force to the test tool;
the test tool is arranged and configured to contact the bond for testing:
a velocity sensor configured to sense an instantaneous relative velocity between the stage and the test tool; and
a controller configured to control the drive mechanism in response to a signal from the velocity sensor.

8. The bond test apparatus of claim 7,
wherein the drive mechanism comprises a voice coil; and
wherein the voice coil is coupled to the stage or to the test tool and the voice coil is configured to provide relative movement between the stage and the test tool such that, in use, the test tool applies a test force to the bond.

9. The bond test apparatus of claim 7, wherein the controller is configured to control the drive mechanism to adjust the relative velocity towards a target relative velocity during application of the test force on the test tool by the bond.

10. The bond test apparatus of claim 7, wherein the velocity sensor comprises a voice coil.

11. The bond test apparatus of claim 7, wherein the controller, the drive mechanism and the velocity sensor form a feedback loop, such that the controller is configured to control the drive mechanism in response to feedback signals from the velocity sensor.

12. The bond test apparatus of claim 7,
wherein the drive mechanism is configured to provide a driving force to the stage to move the stage along a test pathway in a lateral direction;
wherein the test pathway is arranged and configured to cause the bond for testing to contact the test tool; and
wherein the test tool applies a lateral shear force to a side of the bond for testing.

13. The bond test apparatus of claim 7, further comprising a controller configured to provide a target-relative-velocity signal for operation of the drive mechanism.

14. The bond test apparatus of claim 7, wherein during a period that the bond for testing is in contact with the test tool, a cartridge measures a test force applied between the bond for testing and the test tool.

15. A bond test apparatus, comprising:
a test tool;
a stage configured to mount a bond for testing;
a drive mechanism comprising a voice coil; and
the test tool is arranged and configured to contact the bond for testing,
wherein the voice coil is coupled to the stage or to the test tool and the voice coil is configured to provide relative movement between the stage and the test tool such that, in use, the test tool applies a test force to the bond;
wherein the drive mechanism is configured to provide a driving force to the stage to move the stage along a test pathway in a lateral direction;
wherein the test pathway is arranged and configured to cause the bond for testing to contact the test tool; and
wherein the test tool applies a lateral shear force to a side of the bond for testing.

16. A bond test apparatus, comprising:
a test tool;
a stage configured to mount a bond for testing;
a drive mechanism comprising a voice coil;
the test tool is arranged and configured to contact the bond for testing; and
a controller configured to provide a target-relative-velocity signal for operation of the drive mechanism,
wherein the voice coil is coupled to the stage or to the test tool and the voice coil is configured to provide relative movement between the stage and the test tool such that, in use, the test tool applies a test force to the bond.

17. The bond test apparatus of claim 16, wherein the controller controls a driving force to accelerate the stage towards the test tool.

18. A bond test apparatus, comprising:
a test tool;
a stage configured to mount a bond for testing;
a drive mechanism comprising a voice coil; and
the test tool is arranged and configured to contact the bond for testing,
wherein the voice coil is coupled to the stage or to the test tool and the voice coil is configured to provide relative movement between the stage and the test tool such that, in use, the test tool applies a test force to the bond; and
wherein during a period that the bond for testing is in contact with the test tool, a cartridge measures a test force applied between the bond for testing and the test tool.

* * * * *